(12) United States Patent
Tamareselvy et al.

(10) Patent No.: US 7,288,616 B2
(45) Date of Patent: *Oct. 30, 2007

(54) MULTI-PURPOSE POLYMERS, METHODS AND COMPOSITIONS

(75) Inventors: Krishnan Tamareselvy, Brecksville, OH (US); Thomas A. Barker, Akron, OH (US); Pravinchandra K. Shah, Westlake, OH (US); Kittie L. Ramey, Cleveland, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 298 days.

This patent is subject to a terminal disclaimer.

(21) Appl. No.: 10/338,275

(22) Filed: Jan. 8, 2003

(65) Prior Publication Data

US 2003/0207988 A1    Nov. 6, 2003

Related U.S. Application Data

(60) Provisional application No. 60/349,399, filed on Jan. 18, 2002.

(51) Int. Cl.
*C08F 16/12* (2006.01)
*C08F 20/06* (2006.01)

(52) U.S. Cl. .................. 526/333; 526/287; 526/288; 526/307.5; 526/307.6; 526/307.7; 526/318.4; 526/318.5; 526/320; 526/328.5; 526/329.6

(58) Field of Classification Search .............. 526/277, 526/287, 288, 307.5, 307.6, 307.7, 318.4, 526/318.44, 318.5, 320, 328.5, 329.6, 333
See application file for complete search history.

(56) References Cited

U.S. PATENT DOCUMENTS

| | | | |
|---|---|---|---|
| 4,384,096 A | 5/1983 | Sonnabend | |
| 4,421,902 A | 12/1983 | Chang et al. | |
| 4,426,485 A | 1/1984 | Hoy et al. | |
| 4,514,552 A | 4/1985 | Shay et al. | |
| 4,600,761 A | 7/1986 | Ruffner et al. | |
| 4,616,074 A | 10/1986 | Ruffner | |
| 4,743,698 A | 5/1988 | Ruffner et al. | |
| RE33,156 E | 1/1990 | Shay et al. | |
| 4,892,916 A | 1/1990 | Hawe et al. | |
| 4,904,772 A | 2/1990 | Sau | |
| 5,011,978 A | 4/1991 | Barron et al. | |
| 5,102,936 A | 4/1992 | Huth et al. | |
| 5,137,571 A | 8/1992 | Eisenhart et al. | |
| 5,191,051 A | 3/1993 | Shay et al. | |
| 5,292,828 A | 3/1994 | Jenkins et al. | |
| 5,292,843 A | 3/1994 | Jenkins et al. | |
| 5,294,692 A | 3/1994 | Barron et al. | |
| 5,342,883 A | 8/1994 | Jenkins et al. | |
| 5,352,734 A | 10/1994 | Jenkins et al. | |
| 5,362,415 A | 11/1994 | Egraz et al. | |
| 5,399,618 A | 3/1995 | Jenkins et al. | |
| 5,401,802 A | 3/1995 | Jenkins et al. | |
| 5,405,900 A | 4/1995 | Jenkins et al. | |
| 5,412,142 A | 5/1995 | Wilkerson, III et al. | |
| 5,426,182 A | 6/1995 | Jenkins et al. | |
| 5,436,292 A | 7/1995 | Jenkins et al. | |
| 5,461,100 A | 10/1995 | Jenkins et al. | |
| 5,476,900 A | 12/1995 | Jenkins et al. | |
| 5,478,602 A | 12/1995 | Shay et al. | |
| 5,486,587 A | 1/1996 | Shay et al. | |
| 5,488,180 A | 1/1996 | Jenkins et al. | |
| 5,561,189 A | 10/1996 | Jenkins et al. | |
| 5,629,375 A | 5/1997 | Jenkins et al. | |
| 5,639,841 A | 6/1997 | Jenkins | |
| 5,681,882 A | 10/1997 | Jenkins et al. | |
| 5,708,068 A | 1/1998 | Carder et al. | |
| 5,739,196 A | 4/1998 | Jenkins et al. | |
| 5,739,378 A | 4/1998 | Jenkins et al. | |
| 5,770,760 A | 6/1998 | Robinson | |
| 5,863,973 A | 1/1999 | Carder et al. | |

(Continued)

FOREIGN PATENT DOCUMENTS

EP    0 398 576    * 11/1990

(Continued)

OTHER PUBLICATIONS

Kennedy et al. J. Chem. Soc. Faraday Trans., 1995, 91(5), 911-916.*

(Continued)

*Primary Examiner*—Helen L Pezzuto
(74) *Attorney, Agent, or Firm*—Thoburn T. Dunlap; Olson & Hierl, Ltd.

(57) ABSTRACT

Disclosed are multi-purpose alkali-swellable and alkali soluble associative polymers, which are the polymerization product of a monomer mixture comprising: (a) at least one acidic vinyl monomer; (b) at least one nonionic vinyl monomer; (c) a first associative monomer having a first hydrophobic end group; (d) a monomer selected from the group consisting of a second associative monomer having a second hydrophobic end, a semihydrophobic monomer and a combination thereof; and, optionally, (e) one or more crosslinking monomers or chain transfer agents. When monomer (d) is an associative monomer, the first and second hydrophobic end groups of monomers (c) and (d) have significantly different hydrophobic and/or steric character from one another. The multi-purpose associative polymers surprisingly provide desirable Theological and aesthetic properties in aqueous media.

57 Claims, No Drawings

U.S. PATENT DOCUMENTS

| | | | |
|---|---|---|---|
| 5,916,967 | A | 6/1999 | Jones et al. |
| 6,063,857 | A | 5/2000 | Greenblatt et al. |
| 6,083,422 | A | 7/2000 | Ambuter et al. |
| 6,106,578 | A | 8/2000 | Jones |
| 6,140,435 | A | 10/2000 | Zanotti-Russo |
| 6,329,447 | B1 | 12/2001 | Avramidis et al. |
| 6,337,366 | B1 | 1/2002 | Amick et al. |
| 6,451,299 | B1 | 9/2002 | Rigoletto, Jr. et al. |
| 2002/0002934 | A1 | 1/2002 | Nungesser et al. |
| 2002/0042448 | A1 | 4/2002 | Sorrentino et al. |

FOREIGN PATENT DOCUMENTS

| | | |
|---|---|---|
| EP | 0 444 791 A1 * | 9/1991 |
| EP | 1 038 892 A2 | 9/2000 |
| FR | 2777011 | 10/1999 |
| WO | WO96/35757 * | 11/1996 |

OTHER PUBLICATIONS

Riggoletto, R., Jr., et al., "*Styleze™ 2000*—A New Fixative Polymer for Gels-Formulation and Processing Guide (Part I)," *Soap & Cosmetics*, pp. 43-46 (Jul./Aug. 2001).

Riggoletto, R., Jr., et al., "*Styleze™ 2000*—A New Fixative Polymer for Gels-Formulation and Processing Guide (Part II)," *Soap & Cosmetics*, pp. 39-43 (Sep. 2001).

Shay, G.D., "Alkali-Swellable and Alkali-Soluble Thickener Technology—A Review," *Polymers in Aqueous Media, Performance Through Association*, Advances in Chemistry Series, 223, Ch. 25, pp. 457-494, The American Chemical Society, (1989).

Diaz, P., et al., "Set Relaxation of Human Hair," *J. Soc. Cosmet. Chem.*, 34, pp. 205-212 (Jul. 1983).

Rieger, M.J., Ph.D. (ed.), *Harry's Cosmeticology*, 8$^{th}$ Ed., Ch. 30, pp. 666-667, Chemical Publishing Co., Inc., New York, NY (2000).

R.K. Gupta et al., "Rheological Properties of Model Alkali-Soluble Associative (HASE) Polymers: Effect of Varying Acid Monomer and Macromonomer Composition", Proceedings of the International Congress on Rheology, 13$^{th}$, Cambridge, United Kingdom, Aug. 20-25, 2000, vol. 1, 340-342.

R.K. Gupta et al., "Interactions of Methylated.Beta.-Cyclodextrin With Hydrophobically Modified Alkali-Soluble Associative Polymers (HASE): Effect of Varying Carbon Chain Length", Proceedings of the International Congress on Rheology, 13$^{th}$, Cambridge, United Kingdom, Aug. 20-25, 2000, vol. 1, 335-337.

Dr. F. L'Alloret et al., "Aqueous Solution Behavior of New Thermoassociative Polymers", Colloid Polymer Science, vol. 273, No. 12, Dec. 1995, pp. 1163-1173.

D. Hourdet et al., "Synthesis of Thermoassociative Copolymers", Polymer, vol. 38, No. 10, May 1, 1997, pp. 2535-2547.

W.K. NG et al., Rheological Properties of Methacrylic Acid/Ethyl Acrylate Co-polymer: Comparison Between an Unmodified and Hydrophobically Modified System, Polymer, 42, pp. 249-259, 2002.

Sheng Dai et al., Dynamic Light Scattering of Semidilute Hydrophobically Modified Alkali-Soluble Emulsion Solutions with Different Lengths of Poly(ethylene oxide) Spacer Chain, J. Polymer Science: Part B: Polymer Physics, vol. 43, pp. 3288-3298, 2005.

Ahmed A. Abdala et al., Solution Rheology of Hydrophobically Modified Associate Polymers: Effects of Backbone Composition and Hydrophobe Concentration, J. Soc. Rheol., 48(5), pp. 979-994, Sep./Oct. 2004.

Robert J. English et al., Associative Polymers Bearing n-alkyl Hydrophobes: Rheological Evidence for Microgel-like Behavior, J. Soc. Rheol., 43(5), pp. 1175-1194, Sep./Oct. 1999.

K. C. Tam et al., Rheological Properties of Hydrophobically Modified Alkali-Soluble Polymers-Effects of Ethlene-Oxide Chain Length, J. Polymer Science: Part B: Polymer Physics, vol. 36, pp. 2275-2290, 1998.

CRC Handbook of Solubility Parameters and Other Cohesion Parameters, CRC Press, Inc., 1983, p. 76.

* cited by examiner

MULTI-PURPOSE POLYMERS, METHODS AND COMPOSITIONS

CROSS-REFERENCE TO RELATED APPLICATION

This Application claims the priority of U.S. Provisional Application for Patent Ser. No. 60/349,399 filed on Jan. 18, 2002, which is incorporated herein by reference. The following related, commonly assigned, application was filed concurrently herewith: U.S. patent application Ser. No. 10/338,510, which claims priority from U.S. Provisional Application for Patent Ser. No. 60/349,608 filed on Jan. 18, 2002.

TECHNICAL FIELD OF THE INVENTION

This invention relates to the field of anionic polymers, and in particular, to alkali-swellable and alkali-soluble associative polymers.

BACKGROUND OF THE INVENTION

An associative polymer contains pendant groups capable of forming non-specific "associations" with other groups in the polymer or other materials in the medium in which the polymer is present. Generally the pendant group has both hydrophobic and hydrophilic regions and the associations are generally based on hydrophobic interactions. Hydrogen bonding associations between hydrophilic groups have also been seen under some pH conditions. According to theory, such associations result in thickening by the formation of interpolymer networks above a critical polymer overlap concentration.

Hydrophobically modified alkali-swellable or alkali soluble emulsion polymers, conventionally referred to as HASE polymers, are associative polymers that are typically polymerized as stable emulsions at low pH (pH<4.5) but become water swellable or soluble at near neutral to neutral pH (pH>5.5-7). Typical HASE polymers are vinyl addition copolymers of pH sensitive or hydrophilic monomers, hydrophobic monomers and an "associative monomer". The associative monomer has a polymerizable end group, a hydrophilic midsection and a hydrophobic end group. An extensive review of HASE polymers is found in Gregory D. Shay, Chapter 25, "Alkali-Swellable and Alkali-Soluble Thickener Technology A Review", *Polymers in Aqueous Media—Performance Through Association*, Advances in Chemistry Series 223, J. Edward Glass (ed.), ACS, pp. 457-494, Division Polymeric Materials, Washington, D.C. (1989), the relevant disclosures of which are incorporated herein by reference.

Conventional HASE polymers generally contain a single associative monomer. Conventional HASE polymers may be derived from associative monomers having a hydrophobic end group which is substantially a single hydrocarbon moiety or from associative monomers having hydrophobic end groups which are predominantly mixtures of alkyl groups having molecular formulas differing by about 2 carbon atoms with minor amounts of alkyl groups differing by up to about 6 carbon atoms, for example, alkyl groups derived from some natural fatty materials.

Conventional HASE polymers have been used as rheology modifiers, emulsifiers, stabilizers, solubilizers and pigment grinding additives in industrial applications. However, HASE polymers have found limited utility as rheology modifiers in aqueous formulations, because the thickening ability of HASE polymers tends to be relatively low at practical use levels of about 1% or less. Increasing the amount of HASE polymer not only is economically undesirable, but highly viscous HASE polymer solutions can be difficult to handle during manufacturing processes on a commercial scale. In addition, increased thickening often occurs at the expense of the optical clarity of the final product, which is undesirable in certain personal care applications especially for hair care. Consequently, the HASE polymers are conventionally combined with additional rheology modifying polymers.

Some prior attempts have been made to enhance the thickening ability of associative polymers and improve their aqueous thickener performance. For example, U.S. Pat. No. 5,916,967 describes enhancing the thickening ability of associative polymers by mixing the polymer with two or more surfactants. Similarly, surfactant-thickener interactions are disclosed by C. E. Jones in "A Study of the Interaction of Hydrophobically-Modified Polyols with Surfactants", *Proceedings of the 4th World Surfactants Congress, CESIO, Barcelona*, 2, 439-450 (1996) and by P. Reeve in "Tailoring the Properties of Polymeric Rheology Modifiers to the Characteristics and Requirements of Personal Care Formulations", *Proceedings of International Federation of Society of Cosmetic Chemists, IFSCC, Budapest*, 337-346 (April 1997).

An approach for improving the thickening properties of aqueous solutions using macromonomer-derived associative polymers employing surfactants as co-thickeners is disclosed in U.S. Pat. No. 5,292,843. European Patent Application No. 1,038,892A2 describes adding a mixture of at least one multiphobe and at least one monophobe compound (as an additive) particularly to improve the viscosity stability of an aqueous system containing at least one associative thickener. A method of suppressing the viscosity of HASE polymers in aqueous compositions by complexation of the hydrophobic moieties of the polymer with cyclodextrin compounds (capping agent additive) is disclosed in U.S. Pat. No. 5,137,571 and U.S. Pat. No. 6,063,857.

There is an ongoing, unresolved need and desire for an associative polymer having improved Theological and aesthetic properties in an aqueous media. The multi-purpose alkali-swellable associative polymers (ASAP) of the present invention surprisingly provide such desirable Theological and aesthetic properties in aqueous media.

SUMMARY OF THE INVENTION

The present invention discloses multi-purpose, alkali-swellable and alkali-soluble associative polymers, referred to herein as ASAP.

The ASAP of the present invention are the polymerization product of a monomer mixture comprising (a) at least one acidic vinyl monomer; (b) at least one nonionic vinyl monomer; (c) a first associative monomer having a first hydrophobic end group; (d) at least one monomer selected from the group consisting of a second associative monomer having a second hydrophobic end, a semihydrophobic monomer and a combination thereof; and, optionally, (e) one or more crosslinking monomers or chain transfer agents. When a second associative monomer (d) is included in the polymerization, the first and second hydrophobic end groups of the associative monomers (c) and (d) have significantly different hydrophobic and/or steric character from one another.

The ASAP of the present invention can provide products having Theological properties ranging from pourable liquids to non-pourable gels, as well as non-runny, yet flowable, compositions, without requiring additional or auxiliary rheology modifiers. The inventive polymers can also suspend abrasives, pigments, particulates, water insoluble materials, such as encapsulated oil beads, liposomes, capsules, gaseous bubbles, and the like.

Advantageously, the associative polymers of this invention can be employed, without being limited thereto, in personal care products, health care products, household care products, non-household, institutional and industrial care products, and the like and in industrial chemical processes and applications as, for example, rheology modifiers, film formers, thickeners, emulsifiers, stabilizers, solubilizers, suspending agents, and pigment grinding additives. The alkali-swellable, associative polymers are particularly useful as thickeners in textile treatment compositions for finishing, coating and printing applications, and the like. The alkali-soluble, associative polymers are particularly useful for thin viscosity, sprayable and foam compositions.

DESCRIPTION OF THE PREFERRED EMBODIMENTS

As used herein, the term ASAP includes the singular or plural form and refers to acidic/anionic water-swellable or water-soluble, associative polymers, and salts-thereof, which contain two or more non-identical hydrophobically modified polyoxyethylene groups, or which contain at least one hydrophobically modified polyoxyalkylene group and at least one non-hydrophobically modified polyoxyalkylene group. The ASAP may also optionally contain other monomer units, such as crosslinking monomer units, or chain transfer agent units.

It has been surprisingly discovered that the ASAPs are suitable for use in aqueous personal care, health care, household care, and institutional and industrial care ("I&I") products and provide or attenuate rheology modification while retaining and enhancing the desired performance and aesthetic properties of the polymer containing products.

The term "personal care products" as used herein includes, without being limited thereto, cosmetics, toiletries, cosmeceuticals, beauty aids, personal hygiene and cleansing products applied to the body, including the skin, hair, scalp, and nails of humans and animals. The term "health care products" as used herein includes, without being limited thereto, pharmaceuticals, pharmacosmetics, oral care (mouth and teeth) products, such as oral suspensions, mouthwashes, toothpastes, and the like, and over-the-counter products and appliances, such as patches, plasters and the like, externally applied to the body, including the skin, scalp, nails and mucous membranes of humans and animals, for ameliorating a health-related or medical condition, for generally maintaining hygiene or well-being, and the like. The term "household care products" as used herein includes, without being limited thereto, products employed in a domestic household for surface cleaning or maintaining sanitary conditions, such as in the kitchen and bathroom, and laundry products for fabric care and cleaning, and the like. The term "institutional and industrial care" and "I&I" as used herein includes, without being limited thereto, products employed for surface cleaning or maintaining sanitary conditions in institutional and industrial environments, textile treatments, and the like.

As used herein and in the appended claims the term "theological properties" and grammatical variations thereof, includes, without limitation such properties as Brookfield viscosity, increase or decrease-in viscosity in response to shear stress, flow characteristics, gel properties such as stiffness, resilience, flowability, and the like, foam properties such as foam stability, foam density, ability to hold a peak, and the like, and aerosol properties such as ability to form aerosol droplets when dispensed from propellant-based or mechanical pump-type aerosol dispensers. The term "aesthetic property" and grammatical variations thereof as applied to compositions refers to visual and tactile psychosensory product properties, such as color, clarity, smoothness, tack, lubricity, texture, and the like.

The alkali-swellable, associative polymer embodiments of this invention are particularly useful as rheology modifiers in aqueous textile treatment compositions. The term "textile" as used herein includes natural and synthetic fibers in woven or non-woven form, natural and synthetic leathers, and the like. Surprisingly, the inventive alkali-swellable ASAP have been found to be more efficient thickeners than conventional HASE polymer making them suitable for use in textile applications, such as printing, coating, saturation, dyeing, and like textile treatment operations.

The alkali-soluble, associative polymer embodiments of this invention are particularly useful as foam enhancers and as film formers in aqueous, and low VOC (volatile organic compounds) or high VOC pressurized or non-pressurized aerosols.

The term "aqueous" as applied to formulations or media means that water is present in an amount sufficient to at least swell or dissolve the ASAP in the composition into which it is included.

The alkali-swellable and alkali-soluble associative polymers (ASAP) of the present invention are multi-purpose polymers, which are preferably prepared by polymerizing a monomer mixture containing: (a) at least one acidic vinyl monomer or salt thereof; (b) at least one nonionic vinyl monomer; (c) a first associative monomer having a first hydrophobic end group; (d) at least one monomer selected from the group consisting of a second associative monomer having a second hydrophobic end group, a semihydrophobic monomer, and a combination thereof; and, optionally (e) one or more crosslinking monomer or chain transfer agent. When a second associative monomer (d) is included in the polymerization mixture, the first and second hydrophobic end groups of the associative monomers (c) and (d) are each independently selected from the same or different hydrocarbon classes, with the proviso that when the first and second hydrophobic end groups are chosen from the same hydrocarbon class, the molecular formulas of the two hydrophobic end groups differ from one another by at least about 8 carbon atoms. When the polymer comprises two or more associative monomers, the weight ratio of at least two of the associative monomers to one another in the mixture preferably is in the range of about 1:1 to 100:1, more preferably 1:1 to about 20:1, most preferably 1:1 to about 10:1.

In one preferred embodiment, the multi-purpose ASAP is the polymerization product of a monomer mixture comprising, on a total monomer mixture weight basis:

(a) about 10 to about 75 weight percent of at least one acidic vinyl monomer or a salt thereof;

(b) about 10 to about 90 weight percent of at least one nonionic vinyl monomer;

(c) about 0.1 to about 25 weight percent of a first associative monomer having a first hydrophobic end group;

(d) about 0.1 to about 25 weight percent of at least one monomer selected from the group consisting of a second associative monomer having a second hydrophobic end group, a semihydrophobic monomer and a combination thereof; and, optionally, (e) about 0.01 to about 20 weight percent of one or more monomers selected from the group consisting of a crosslinking monomer, a chain transfer agent, and a combination thereof.

A particularly preferred alkali-swellable associative polymer embodiment of the present invention is the product of polymerization of a monomer mixture comprising, on a total monomer mixture weight basis: (a) about 30 to about 75 weight percent of at least one acidic vinyl monomer or a salt thereof; (b) at least about 25 weight percent, but not more than 60 weight percent of at least one nonionic vinyl monomer; (c) about 0.5 to about 20 weight percent of a first associative monomer having a first hydrophobic end group; (d) about 0.5 to about 20 weight percent of at least one monomer selected from the group consisting of a second associative monomer having a second hydrophobic end group, a semihydrophobic monomer, and a combination thereof; and, optionally, (e) up to about 20 weight percent of a crosslinking monomer. When monomer (d) is a second associative monomer, the first and second hydrophobic end groups of associative monomers (c) and (d) are each independently selected from the same or different hydrocarbon classes. When the first and second hydrophobic end groups are selected from the same hydrocarbon class, the molecular formulas of the hydrophobic end groups differ by at least about 8 carbon atoms. The associative polymers of this preferred embodiment are alkali-swellable and provide excellent rheology modifying characteristics, providing relatively high viscosity to alkaline aqueous systems in which the polymer is present. Examples of these preferred alkali-swellable polymers are provided in Tables 2A-2C, below.

Another preferred embodiment of the present invention is an alkali-soluble, relatively low viscosity associative polymer. The alkali-soluble associative polymer of this preferred embodiment is the product of polymerization of a monomer mixture comprising, on a total monomer mixture weight basis: (a) about 10 to about 30 weight percent of at least one acidic vinyl monomer or a salt thereof; (b) more than 60 weight percent of at least one nonionic vinyl monomer; (c) about 0.5 to about 5 weight percent of at least one associative monomer having a hydrophobic end group; (d) about 0.5 to about 5 weight percent of at least one semihydrophobic monomer having a polymerizable, unsaturated end group and a polyoxyalkylene group covalently bonded thereto; and (e) about 0.5 to about 5 weight percent of a chain transfer agent. The alkali-soluble associative polymers of this preferred embodiment provide good film-forming and humidity resistance properties, making them suitable for compositions-, such as pumpable or sprayable hydro-alcoholic compositions, where a thin viscosity is desirable. Examples of these preferred alkali-soluble associative polymers are provided in Table 2D, below.

Preferably, the hydrophobic end groups of the associative monomers utilized in the polymers of the present invention are selected from the group consisting of a $C_8$-$C_{40}$ linear alkyl, a $C_8$-$C_{40}$ branched alkyl, a $C_8$-$C_{40}$ carbocyclic alkyl, an aryl-substituted $C_2$-$C_{40}$ alkyl, a $C_2$-$C_{40}$ alkyl-substituted phenyl, and a $C_8$-$C_{80}$ complex ester.

The first and second hydrophobic end groups of the associative monomer components can be selected from the same or different hydrocarbon classes. However, when a second associative monomer is present, and both the first and second associative monomers have hydrophobic end groups belonging to the same hydrocarbon class (e.g., both hydrophobic end groups are $C_8$-$C_{40}$ linear alkyl groups) then, the molecular formulas of the hydrophobic end groups are selected to differ from each other preferably by at least about 12 carbon atoms, more preferably by at least about 10 carbon atoms, and most preferably by at least about 8 carbon atoms.

In a particularly preferred embodiment, at least one associative monomer has a hydrophobic end group which is a $C_{12}$-$C_{40}$ linear alkyl group.

When more than two associative monomers are utilized to prepare the ASAP of the present invention, preferably at least two of the associative monomers have hydrophobic end groups selected from different hydrocarbon classes. When more than two associative monomers are utilized to prepare the ASAP of the present invention, and all of the utilized associative monomers have hydrophobic end groups selected from the same hydrocarbon class, the molecular formula of the hydrophobic end group having the largest number of carbon atoms preferably has at least about 12 more carbon atoms, more preferably at least about 10 more carbon atoms, and most preferably at least about 8 more carbon atoms, than the molecular formula of the hydrophobic end group having the least number of carbon atoms.

However, when the polymerization mixture comprises a combination of a second associative monomer and a semihydrophobic monomer, there is no limitation as to the molecular formulas of the first and second hydrophobic end groups of the associative monomers. When the polymerization mixture includes a semihydrophobic monomer and two or more associative monomers, the first and second associative monomers can comprise any combination of first and second hydrophobic end groups, without limitation as to hydrocarbon class or number of carbon atoms in molecular formulas of their respective hydrophobic end groups.

The terms "first" and "second" as used herein in relation to associative monomers and their respective hydrophobic end groups means that two or more different associative monomers are employed, and are not intended to imply any temporal relationship in the addition of the monomers to the reaction mixture, nor are the terms intended to connote any functional difference between the monomers or hydrophobic end groups. The term "(meth)acrylate" includes, alternatively, acrylate or methacrylate, and the term "(meth)acrylamide" includes, alternatively, acrylamide or methacrylamide.

As used herein the term "alkyl" means a substituted or unsubstituted aliphatic hydrocarbon moiety; the term "carbocyclic alkyl" means an alkyl group comprising one or more carbocyclic rings of from 3 to about 12 carbon atoms in size; and the term "aryl" means a substituted or unsubstituted phenyl or naphthyl moiety. Modifiers of the form "$C_x$-$C_y$" designate that the alkyl or carbocyclic alkyl groups have molecular formulas containing a total of x to y carbon atoms, where x and y are specified integers. The terms "halogen-substituted", "hydroxy-substituted", "carboxy-substituted", "polyoxyalkylene-substituted", alkyl-substituted", and "aryl-substituted" as used herein in reference to alkyl or aryl groups, and the like, mean that at least one hydrogen atom on an alkyl, aryl, or like group has been replaced by at least one halogen atom, hydroxyl group, carboxyl group, polyoxyalkylene group, alkyl group, or aryl group, respectively.

Suitable monomers useful in the preparation of the multi purpose associative polymers of the present invention are as described below.

Acidic Vinyl Monomer

Acidic vinyl monomers suitable for use in the present invention are acidic, polymerizable, ethylenically unsaturated monomers preferably containing at least one carboxylic acid, sulfonic acid group, or a phosphonic acid group to provide an acidic or anionic functional site. These acid groups can be derived from monoacids or diacids, anhydrides of dicarboxylic acids, monoesters of diacids, and salts thereof.

Suitable acidic vinyl carboxylic acid-containing monomers include, but are not limited to: acrylic acid, methacrylic acid, itaconic acid, citraconic acid, maleic acid, fumaric acid, crotonic acid, aconitic acid, and the like, and $C_1$-$C_{18}$ alkyl-monoesters of maleic, fumaric, itaconic, or aconitic acid, such as methyl hydrogen maleate, monoisopropyl maleate, butyl hydrogen fumarate, and the like. Anhydrides of dicarboxylic acids, such as maleic anhydride, itaconic anhydride, citraconic anhydride, and the like can also be utilized as acidic vinyl monomers. Such anhydrides generally hydrolyze to the corresponding diacids upon prolonged exposure to water, or at elevated pH.

Suitable sulfonic acid group-containing monomers include, but are not limited to: vinyl sulfonic acid, 2-sulfoethyl methacrylate, styrene sulfonic acid, 2-acrylamido-2-methylpropane sulfonic acid (AMPS), allyloxybenzene sulfonic acid, and the like. Particularly preferred are the sodium salt of styrene sulfonic acid (SSSA) and AMPS.

Non-limiting examples of suitable phosphonic acid group-containing monomers include vinyl phosphonic acid, allyl phosphonic acid, 3-acrylamidopropyl phosphonic acid, and the like.

Suitable salts include, without limitation thereto, alkali metal salts, such as sodium, potassium and lithium salts; alkaline earth metal salts, such as calcium and magnesium salts; ammonium salts; and alkyl-substituted ammonium salts, such as salts of 2-amino-2-methyl-1-propanol (AMP), ethanolamine, diethanolamine, triethanolamine, triethylamine, and the like.

The foregoing monomers or salts thereof can be used as the acidic vinyl monomer component of the inventive ASAP, individually, or in mixtures of two or more. Acrylic acid, methacrylic acid, the sodium salt of styrene sulfonic acid (SSSA), AMPS as well as fumaric acid, maleic acid, itaconic acid, and monoesters or monoamides thereof, are preferred. Particularly preferred acidic vinyl monomers are acrylic and methacrylic acid, SSSA, and AMPS.

The acidic vinyl monomer preferably comprises about 10 to about 75 weight percent of the total monomer mixture, more preferably about 25 to about 65 weight percent, and most preferably about 30 to about 60 weight percent, on a total monomer mixture weight basis.

Nonionic Monomer

Nonionic vinyl monomers suitable for use in the present invention are copolymerizable, nonionic, ethylenically unsaturated monomers, which are well known in the art. Preferred nonionic vinyl monomers are compounds having either of the following formulas (I) or (II):

wherein, in each of formulas (I) and (II), X is H or methyl; and Z is —C(O)OR$^1$, —C(O)NH$_2$, —C(O)NHR$^1$, —C(O)N(R$^1$)$_2$, —C$_6$H$_4$R$^1$, —C$_6$H$_4$OR$^1$, —C$_6$H$_4$Cl, —CN, —NHC(O)CH$_3$, —NHC(O)H, N-(2-pyrrolidonyl), N-caprolactamyl, —C(O)NHC(CH$_3$)$_3$, —C(O)NHCH$_2$CH$_2$—N-ethyleneurea, —SiR$_3$, —C(O)O(CH$_2$)$_x$SiR$_3$, —C(O)NH(CH$_2$)$_x$SiR$_3$, or —(CH$_2$)$_x$SiR$_3$; x is an integer in the range of 1 to about 6; each R is independently C$_1$-C$_{18}$ alkyl; each R$^1$ is independently C$_1$-C$_{30}$ alkyl, hydroxy-substituted C$_2$-C$_{30}$ alkyl, or halogen-substituted C$_1$-C$_{30}$ alkyl.

Non-limiting examples of suitable water-insoluble, nonionic vinyl monomers include C$_1$-C$_{30}$ alkyl (meth)acrylates; C$_1$-C$_{30}$ alkyl (meth)acrylamides; styrene; substituted styrenes, such as vinyl toluene (e.g., 2-methyl styrene), butyl styrene, isopropyl styrene, p-chloro styrene, and the like; vinyl esters, such as vinyl acetate, vinyl butyrate, vinyl caprolate, vinyl pivalate, vinyl neodecanoate, and the like; unsaturated nitrites, such as methacrylonitrile, acrylonitrile, and the like; and unsaturated silanes, such as trimethylvinylsilane, dimethylethylvinylsilane, allyldimethylphenylsilane, allytrimethylsilane, 3-acrylamidopropyltrimethylsilane, 3-trimethylsilylpropyl methacrylate, and the like.

Non-limiting examples of suitable water-soluble nonionic vinyl monomers are C$_2$-C$_6$ hydroxyalkyl (meth)acrylates; glycerol mono(meth)acrylate; tris(hydroxymethyl)ethane mono(meth)acrylate; pentaerythritol mono(meth)acrylate; N-hydroxymethyl (meth)acrylamide; 2-hydroxyethyl (meth)acrylamide; 3-hydroxypropyl (meth)acrylamide; (meth)acrylamide; N-vinyl caprolactam; N-vinyl pyrrolidone; methacrylamidoethyl-N-ethyleneurea (e.g., CH$_2$=C(CH$_3$)C(O)NHCH$_2$CH$_2$—N-ethyleneurea), C$_1$-C$_4$ alkoxy-substituted (meth)acrylates and (meth)acrylamides, such as methoxyethyl (meth)acrylate, 2-(2-ethoxyethoxy)ethyl (meth)acrylate, and the like; and combinations thereof.

Particularly preferred nonionic vinyl monomers include C$_1$-C$_{18}$ alkyl esters of acrylic acid and of methacrylic acid, methacrylamidoethyl-N-ethylene urea, and combinations thereof.

The nonionic vinyl monomer preferably comprises about 10 to about 90 weight percent of the total monomer mixture, more preferably about 25 to about 75 weight percent, and most preferably about 30 to about 60 weight percent, on a total monomer mixture weight basis.

Associative Monomer

Associative monomers suitable for the production of the inventive ASAP are compounds preferably having an ethylenically unsaturated end group portion (i) for addition polymerization with the other monomers of the system; a polyoxyalkylene midsection portion (ii) for imparting selective hydrophilic properties to the product polymer and a hydrophobic end group portion (iii) for providing selective hydrophobic properties to the polymer.

The portion (i) supplying the ethylenically unsaturated end group preferably is derived from an α,β-ethylenically unsaturated mono or di-carboxylic acid or the anhydride thereof, more preferably a C$_3$ or C$_4$ mono- or di-carboxylic acid or the anhydride thereof. Alternatively, portion (i) of the associative monomer can be derived from an allyl ether or vinyl ether; a nonionic vinyl-substituted urethane monomer, such as disclosed in U.S. Reissue Pat. No. 33,156 or U.S. Pat. No. 5,294,692; or a vinyl-substituted urea reaction product, such as disclosed in U.S. Pat. No. 5,011,978; the relevant disclosures of each are incorporated herein by reference.

The midsection portion (ii) is preferably a polyoxyalkylene segment of about 5 to about 250, more preferably about 10 to about 120, and most preferably about 15 to about 60 repeating C$_2$-C$_7$ alkylene oxide units. Preferred midsection portions (ii) include polyoxyethylene, polyoxypropylene, and polyoxybutylene segments comprising about 5 to about 150, more preferably about 10 to about 100, and most preferably about 15 to about 60 ethylene, propylene or butylene oxide units, and random or non-random sequences of ethylene oxide, propylene oxide and or butylene oxide units.

The hydrophobic end group portion (iii) of the associative monomers is preferably a hydrocarbon moiety belonging to one of the following hydrocarbon classes: a $C_8$-$C_{40}$ linear alkyl, an aryl-substituted $C_2$-$C_{40}$ alkyl, a $C_2$-$C_{40}$ alkyl-substituted phenyl, a $C_8$-$C_{40}$ branched alkyl, a $C_8$-$C_{40}$ carbocyclic alkyl; and a $C_8$-$C_{80}$ complex ester.

As used herein and in the appended claims, the term "complex ester" means a di-, tri-, or poly-ester of a polyol such as a sugar, having at least one hydroxyl group capable of being alkylated with a $C_2$-$C_7$ alkylene oxide. The term "complex ester" includes, in particular, the complex hydrophobes described by Jenkins et al. in U.S. Pat. No. 5,639,841, the relevant disclosure of which is incorporated herein by reference.

Non-limiting examples of suitable hydrophobic end group portions (iii) of the associative monomers are linear or branched alkyl groups having about 8 to about 40 carbon atoms, such as capryl ($C_8$), iso-octyl (branched $C_8$), decyl ($C_{10}$), lauryl ($C_{12}$), myristyl ($C_{14}$), cetyl ($C_{16}$), cetearyl ($C_{16}$-$C_{18}$), stearyl ($C_{18}$), isostearyl (branched $C_{18}$), arachidyl ($C_{20}$), behenyl ($C_{22}$), lignoceryl ($C_{24}$), cerotyl ($C_{26}$), montanyl ($C_{28}$), melissyl ($C_{30}$), lacceryl ($C_{32}$), and the like.

Examples of linear and branched alkyl groups having about 8 to about 40 carbon atoms that are derived from a natural source include, without being limited thereto, alkyl groups derived from hydrogenated peanut oil, soybean oil and canola oil (all predominately $C_{18}$), hydrogenated tallow oil ($C_{16}$-$C_{18}$), and the like; and hydrogenated $C_{10}$-$C_{30}$ terpenols, such as hydrogenated geraniol (branched $C_{10}$), hydrogenated farnesol (branched $C_{15}$), hydrogenated phytol (branched $C_{20}$), and the like.

Non-limiting examples of suitable $C_2$-$C_{40}$ alkyl-substituted phenyl groups include octylphenyl, nonylphenyl, decylphenyl, dodecylphenyl, hexadecylphenyl, octadecylphenyl, isooctylphenyl, sec-butylphenyl, and the like.

Suitable $C_8$-$C_{40}$ carbocylic alkyl groups include, without being limited thereto, groups derived from sterols from animal sources, such as cholesterol, lanosterol, 7-dehydrocholesterol, and the like; from vegetable sources, such as phytosterol, stigmasterol, campesterol, and the like; and from yeast sources, such as ergosterol, mycosterol, and the like. Other carbocyclic alkyl hydrophobic end groups useful in the present invention include, without being limited thereto, cyclooctyl, cyclododecyl, adamantyl, decahydronaphthyl, and groups derived from natural carbocyclic materials, such as pinene, hydrogenated retinol, camphor, isobornyl alcohol, and the like.

Exemplary aryl-substituted $C_2$-$C_{40}$ alkyl groups include, without limitation thereto, styryl (e.g., 2-phenylethyl), distyryl (e.g., 2,4-diphenylbutyl), tristyryl (e.g., 2,4,6-triphenylhexyl), 4-phenylbutyl, 2-methyl-2-phenylethyl, tristyrylphenolyl, and the like.

Non-limiting examples of suitable $C_8$-$C_{80}$ complex esters include hydrogenated castor oil (predominately the triglyceride of 12-hydroxystearic acid); 1,2-diacyl glycerols, such as 1,2-distearyl glycerol, 1,2-dipalmityl glycerol, 1,2-dimyristyl glycerol, and the like; di-, tri-, or poly-esters of sugars, such as 3,4,6-tristearyl glucose, 2,3-dilauryl fructose, and the like; and sorbitan esters, such as those disclosed in U.S. Pat. No. 4,600,761 to Ruffner et al., the pertinent disclosures of which are incorporated herein by reference.

Useful associative monomers can be prepared by any method known in the art. See, for example, U.S. Pat. No. 4,421,902 to Chang et al.; U.S. Pat. No. 4,384,096 to Sonnabend; U.S. Pat. No. 4,514,552 to Shay et al.; U.S. Pat. No. 4,600,761 to Ruffner et al.; U.S. Pat. No. 4,616,074 to Ruffner; U.S. Pat. No. 5,294,692 to Barron et al.; U.S. Pat. No. 5,292,843 to Jenkins et al.; U.S. Pat. No. 5,770,760 to Robinson; and U.S. Pat. No. 5,412,142 to Wilkerson, III et al.; the pertinent disclosures of which are incorporated herein by reference.

Examples of preferred associative monomers include those having formula (III).

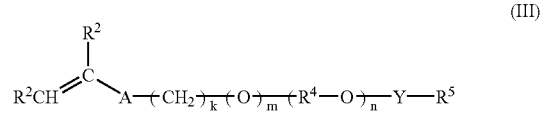

(III)

wherein
each $R^2$ is independently H, methyl, —C(O)OH, or —C(O)OR$^3$; $R^3$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; k is an integer in the range of 0 to about 30, and m is 0 or 1, with the proviso that when k is 0, m is 0, and when k is in the range of 1 to about 30, m is 1; (R$^4$—O)$_n$ is a polyoxyalkylene, which is a homopolymer, a random copolymer, or a block copolymer of $C_2$-$C_4$ oxyalkylene units, wherein $R^4$ is $C_2H_4$, $C_3H_6$, or $C_4H_8$, and n is an integer in the range of about 5 to about 250, preferably about 5 to about 100, more preferably about 10 to about 80, and most preferably about 15 to about 60; Y is —R$^4$O—, —R$^4$NH—, —C(O)—, —C(O)NH—, —R$^4$NHC(O)NH—, or —C(O)NHC(O)—; $R^5$ is a substituted or unsubstituted alkyl selected from the group consisting of a $C_8$-$C_{40}$ linear alkyl, a $C_8$-$C_{40}$ branched alkyl, a $C_8$-$C_{40}$ carbocyclic alkyl, a $C_2$-$C_{40}$ alkyl-substituted phenyl, an aryl-substituted $C_2$-$C_{40}$ alkyl, and a $C_8$-$C_{80}$ complex ester; wherein the $R^5$ alkyl group optionally comprises one or more substituents selected from the group consisting of a hydroxyl group, an alkoxyl group, and a halogen group.

Particularly preferred associative monomers of formula (III) include cetyl polyethoxylated methacrylate (CEM), cetearyl polyethoxylated methacrylate (CSEM), stearyl polyethoxylated (meth)acrylate, arachidyl polyethoxylated (meth)acrylate, behenyl polyethoxylated methacrylate (BEM), cerotyl polyethoxylated (meth)acrylate, montanyl polyethoxylated (meth)acrylate, melissyl polyethoxylated (meth)acrylate, lacceryl polyethoxylated (meth)acrylate, tristyrylphenol polyethoxylated methacrylate (TEM), hydrogenated castor oil polyethoxylated methacrylate (HCOEM), canola polyethoxylated (meth)acrylate, and cholesterol polyethoxylated methacrylate (CHEM), where the polyethoxylated portion of the monomer comprises about 5 to about 100, preferably about 10 to about 80, and more preferably about 15 to about 60 ethylene oxide repeating units.

Preferably, the associative monomer components in the monomer mixture independently comprise, on a total monomer mixture weight basis, about 0.1 to about 25 weight percent of the monomer mixture, more preferably about 0.25 to about 20 weight percent, most preferably about 0.5 to about 15 weight percent.

Semihydrophobic Monomer

It was surprisingly found that a semihydrophobic monomer (SH monomer) can moderate the associative properties of polymers containing them, thus producing aqueous gels with highly desirable texture and rheological properties. Not wishing to be bound by theory, it is thought that the polyoxyalkylene group of the SH monomer interrupts or shields against non-specific associations between the hydrophobic groups of the associative monomers in the polymer, or external components and thus attenuates the associative properties of the polymers. Such SH monomers can tailor the thickening efficiency of the resulting polymers to customize the rheological properties of the polymer as desired for a selected application. Most surprisingly, alkali-swellable polymers containing the SH monomers were found to impart desirable rheological and aesthetic properties to aqueous gels, generally providing softer, smoother and more spreadable gels at all polymer concentrations than did alkali-swellable associative polymers containing no SH monomer and provided a Brookfield viscosity that remained substantially unchanged over a period of 24 hours.

Surprisingly, incorporation of a SH monomer into an alkali-swellable associative polymer can reduce gel viscosity at low shear stress, minimize or eliminate viscosity reduction as shear stress is increased and minimize or decrease shear thinning behavior of the gels. For example, Polymer CP-5, described in Example 1 below, having 3% BEM25 associative monomer, when measured by a complex viscosity technique at an active polymer weight concentration of about 1.2%, had a viscosity of 178 Pa·s (178,000 cP) at a shear stress of 1 Pa; and increasing the shear stress to 5 Pa led to a reduction in complex viscosity to 43.6 Pa·s. Adding a SH monomer to the polymer, e.g. as in Polymer AG, Example 1, which has 3% BEM25 and 5% of the SH monomer R307, had two effects. First, the complex viscosity measured at an active polymer weight concentration of about 1.2% at 1 Pa shear stress was reduced to 106 Pa·s. Second, upon increasing the shear stress to 5 Pa, the complex viscosity measurement remained almost unchanged (105.5 Pa·s). Similarly, when 15% of SH monomer was incorporated (e.g., as in Polymer AI, Example 1), the complex viscosity measured at an active polymer weight concentration of about 1.2% at 1 Pa shear stress was 46.5 Pa·s, whereas at 5 Pa shear stress the complex viscosity measured was 36 Pa·s.

As used herein and in the appended claims, the terms semihydrophobic monomer" and "SH monomers" refer to compounds having two portions: (i) an ethylenically unsaturated end group portion for addition polymerization with the other monomers of the reaction mixture, and (ii) a polyoxyalkylene portion for attenuating the associations between the hydrophobic groups of the polymer or hydrophobic groups from other materials in a composition containing the polymer. A semihydrophobic monomer is similar to an associative monomer, but has a substantially non-hydrophobic end group portion.

The unsaturated end group-portion (i) supplying the vinyl or other ethylenically unsaturated end group for addition polymerization is preferably derived from an α,β-ethylenically unsaturated mono or di-carboxylic acid or the anhydride thereof, preferably a $C_3$ or $C_4$ mono- or di-carboxylic acid, or the anhydride thereof. Alternatively, the end group portion (i) can be derived from an allyl ether, a vinyl ether or a nonionic urethane monomer.

The polymerizable unsaturated end group portion (i) can also be derived from a $C_8$-$C_{30}$ unsaturated fatty acid group containing at least one free carboxy-functional group. This $C_8$-$C_{30}$ group is part of the unsaturated end group portion (i) and is different from the hydrophobic groups pendant to the associative monomers, which are specifically separated from the unsaturated end group of the associative monomer by a hydrophilic "spacer" portion.

The polyoxyalkylene portion (ii) specifically comprises a long-chain polyoxyalkylene segment, which is substantially similar to the hydrophilic portion of the associative monomers. Preferred polyoxyalkylene portions (ii) include polyoxyethylene, polyoxypropylene, and polyoxybutylene units comprising about 2 to about 250, and preferably about 10 to about 100 ethylene oxide, propylene oxide, or butylene oxide units, or random or non-random sequences of ethylene oxide, propylene oxide, and/or butylene oxide units.

Preferred SH monomers include those having either of the following formulas (IV) or (V):

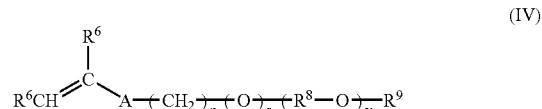

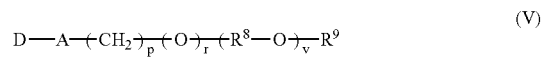

wherein, in each of formulas (IV) and (V),
each $R^6$ is independently H, $C_1$-$C_{30}$ alkyl, —C(O)OH, or —C(O)OR$^7$; $R^7$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; p is an integer in the range of 0 to about 30, and r is 0 or 1, with the proviso that when p is 0, r is 0, and when p is in the range of 1 to about 30, r is 1; $(R^8$—O$)_v$ is a polyoxyalkylene, which is a homopolymer, a random copolymer, or a block copolymer of $C_2$-$C_4$ oxyalkylene units, wherein $R^8$ is $C_2H_4$, $C_3H_6$, or a mixture thereof, and v is an integer in the range of about 5 to about 250, preferably about 5 to about 100, more preferably about 10 to about 80, and most preferably about 15 to about 60; $R^9$ is H or $C_1$-$C_4$ alkyl; and D is a $C_8$-$C_{30}$ unsaturated alkyl or a carboxy-substituted $C_8$-$C_{30}$ unsaturated alkyl.

Particularly preferred semihydrophobic monomers include monomers having the following chemical formulas:

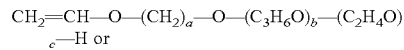

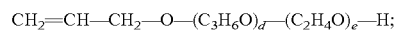

wherein a, preferably, is 2, 3, or 4; b, preferably, is an integer in the range of 1 to about 10, more preferably about 2 to about 8, most preferably about 3 to about 7; c, preferably, is an integer in the range of about 5-to about 50, more preferably about 8 to about 40, most preferably about 10 to about 30; d, preferably, is an integer in the range of 1 to about 10, more preferably about 2 to about 8, most preferably about 3 to about 7; and e, preferably, is an integer in the range of about 5 to about 50, more preferably about 8 to about 40.

Examples of preferred SH monomers include polymerizable emulsifiers commercially available under the trade names EMULSOGEN® R109, R208, R307, RAL109, RAL208, and RAL307 sold by Clariant Corporation; BX-AA-E5P5 sold by Bimax, Inc.; and MAXEMUL® 5010 and 5011 sold by Uniqema; and combinations thereof. Particularly preferred SH monomers include EMULSOGEN® R109, R208, and R307, BX-AA-E5P5, MAXEMUL® 5010 and 5011, and combinations thereof.

According to the manufacturers: EMULSOGEN® R109 is a randomly ethoxylated/propoxylated 1,4-butanediol vinyl ether having the empirical formula $CH_2=CH-O(CH_2)_4O(C_3H_6O)_4(C_2H_4O)_{10}H$; EMULSOGEN® R208 is a randomly ethoxylated/propoxylated 1,4-butanediol vinyl ether having the empirical formula $CH_2=CH-O(CH_2)_4O(C_3H_6O)_4(C_2H_4O)_{20}H$; EMULSOGEN® R307 is a randomly ethoxylated/propoxylated 1,4-butanediol vinyl ether having the empirical formula $CH_2=CH-O(CH_2)_4O(C_3H_6O)_4(C_2H_4O)_{30}H$; EMULSOGEN® RAL109 is a randomly ethoxylated/propoxylated allyl ether having the empirical formula $CH_2=CHCH_2O(C_3H_6O)_4(C_2H_4O)_{10}H$; EMULSOGEN® RAL208 is a randomly ethoxylated/propoxylated allyl ether having the empirical formula $CH_2=CHCH_2O(C_3H_6O)_4(C_2H_4O)_{20}H$; EMULSOGEN® RAL307 is a randomly ethoxylated/propoxylated allyl ether having the empirical formula $CH_2=CHCH_2O(C_3H_6O)_4(C_2H_4O)_{30}H$; MAXEMUL® 5010 is a carboxy-functional $C_{12}$-$C_{15}$ alkenyl hydrophobe, ethoxylated with about 24 ethylene oxide units; MAXEMUL® 5011 is a carboxy-functional $C_{12}$-$C_{15}$ alkenyl hydrophobe, ethoxylated with about 34 ethylene oxide units; and BX-AA-E5P5 is a randomly ethoxylated/propoxylated allyl ether having the empirical formula $CH_2=CHCH_2O(C_3H_6O)_5(C_2H_4O)_5H$.

The amount of semihydrophobic monomers utilized in the preparation of the polymers of the present invention can vary widely and depends, among other things, on the final rheological and aesthetic properties desired in the polymer. When utilized, the monomer reaction mixture preferably contains one or more semihydrophobic monomers in amounts in the range of about 0.1 to about 25 weight percent based on the total monomer mixture weight, more preferably about 0.5 to about 20 weight percent, most preferably about 1 to about 15 weight percent.

Crosslinking Monomer

The ASAP can optionally be prepared from a monomer mixture comprising one or more crosslinking monomer for introducing branching and controlling molecular weight. Suitable polyunsaturated crosslinkers are well known in the art. Mono-unsaturated compounds carrying a reactive group that is capable of causing a formed copolymer to be crosslinked before, during, or after polymerization has taken place can also be utilized. Other useful crosslinking monomers include polyfunctional monomers containing multiple reactive groups, such as epoxide groups, isocyanate groups, and hydrolyzable silane groups. Various polyunsaturated compounds can be utilized to generate either a partially or substantially cross-linked three dimensional network.

Examples of suitable polyunsaturated crosslinking monomer components include, without being limited thereto, polyunsaturated aromatic monomers, such as divinylbenzene, divinyl naphthalene, and trivinylbenzene; polyunsaturated alicyclic monomers, such as 1,2,4-trivinylcyclohexane; di-functional esters of phthalic acid, such as diallyl phthalate; polyunsaturated aliphatic monomers, such as dienes, trienes, and tetraenes, including isoprene, butadiene, 1,5-hexadiene, 1,5,9-decatriene, 1,9-decadiene, 1,5-heptadiene; and the like.

Other suitable polyunsaturated crosslinking monomers include polyalkenyl ethers, such as triallyl pentaerythritol, diallyl pentaerythritol, diallyl sucrose, octaallyl sucrose, and trimethylolpropane diallyl ether; polyunsaturated esters of polyalcohols or polyacids, such as 1,6-hexanediol di(meth)acrylate, tetramethylene tri(meth)acrylate, allyl acrylate, diallyl itaconate, diallyl fumarate, diallyl maleate, trimethylolpropane tri(meth)acrylate, trimethylolpropane di(meth)acrylate, and polyethylene glycol di(meth)acrylate; alkylene bisacrylamides, such as methylene bisacrylamide, propylene bisacrylamide, and the like; hydroxy and carboxy derivatives of methylene bis-acrylamide, such as N,N'-bismethylol methylene bisacrylamide; polyethyleneglycol di(meth)acrylates, such as ethyleneglycol di(meth)acrylate, diethyleneglycol di(meth)acrylate, and triethyleneglycol di(meth)acrylate; polyunsaturated silanes, such as dimethyldivinylsilane, methyltrivinylsilane, allyldimethylvinylsilane, diallydimethylsilane and tetravinylsilane; polyunsaturated stannanes, such as tetraallyl tin, diallyldimethyl tin; and the like.

Useful monounsaturated compounds carrying a reactive group include N-methylolacrylamide; N-alkoxy(meth)acrylamide, wherein the alkoxy group is a $C_1$-$C_{18}$ alkoxy; and unsaturated hydrolyzable silanes, such as triethoxyvinylsilane, tris-isopropoxyvinylsilane, 3-triethoxysilylpropyl methacrylate, and the like.

Useful polyfunctional crosslinking monomers containing multiple reactive groups include, but are not limited to, hydrolyzable silanes, such as ethyltriethoxysilane and ethyltrimethoxysilane, epoxy-substituted hydrolyzable silanes, such as 2-(3,4-epoxycyclohexyl)ethyltriethoxysilane and 3-glycidoxypropyltrimethyoxysilane; polyisocyanates, such as 1,4-diisocyanatobutane, 1,6-diisocyanatohexane, 1,4-phenylenediisocyanate and 4,4'-oxybis(phenylisocyanate); unsaturated epoxides, such as glycidyl methacrylate and allylglycidyl ether; polyepoxides, such as diglycidyl ether, 1,2,5,6-diepoxyhexane, and ethyleneglycoldiglycidyl ether; and the like.

Particularly useful are polyunsaturated crosslinkers derived from ethoxylated polyols, such as diols, triols and bis-phenols, ethoxylated with about 2 to about 100 moles of ethylene oxide per mole of hydroxyl functional group and end-capped with a polymerizable unsaturated group, such as a vinyl ether, allyl ether, acrylate ester, methacrylate ester, and the like. Examples of such crosslinkers include bisphenol A ethoxylated dimethacrylate; bisphenol F ethoxylated dimethacrylate, trimethylol propane ethoxylated trimethacrylate, and the like. Other ethoxylated crosslinkers useful in the ASAP polymers of the present invention include ethoxylated polyol-derived crosslinkers disclosed in U.S. Pat. No. 6,140,435 to Zanotti-Russo, the pertinent disclosures of which are incorporated herein by reference.

Examples of particularly preferred crosslinkers are acrylate and methacrylate esters of polyols having at least two acrylate or methacrylate ester groups, such as trimethylolpropane triacrylate (TMPTA), trimethylolpropane dimethacrylate, polyethylene glycol dimethacrylate, ethoxylated (30) bisphenol A dimethacrylate (EOBDMA), and the like.

When utilized, crosslinking monomers are present in the monomer reaction mixture preferably in an amount in the range of about 0.01 to about 2 weight percent, based on the total monomer mixture weight, more preferably about 0.05 to about 1.5 weight percent, most preferably about 0.1 to about 1 weight percent of the monomer mixture.

Chain Transfer Agent

The ASAP of the present invention can optionally be prepared from a monomer mixture comprising one or more chain transfer agents, which are well known in the polymer arts.

Suitable chain transfer agents for use in this invention, without being limited thereto, are selected from a variety of thio and disulfide containing compounds, such as $C_1$-$C_{18}$ alkyl mercaptans, mercaptocarboxylic acids, mercaptocarboxylic esters, thioesters, $C_1$-$C_{18}$ alkyl disulfides, aryldisulfides, polyfunctional thiols, and the like; phosphites and hypophosphites; haloalkyl compounds, such as carbon tetrachloride, bromotrichloromethane, and the like; and unsaturated chain transfer agents, such as alpha-methylstyrene.

Polyfunctional thiols include trifunctional thiols, such as trimethylolpropane-tris-(3-mercaptopropionate), tetrafunctional thiols, such as pentaerythritol-tetra-(3-mercaptopropionate), pentaerythritol-tetra-(thioglycolate), and pentaerythritol-tetra-(thiolactate); hexafunctional thiols, such as dipentaerythritol-hexa-(thioglycolate); and the like.

Alternatively, the chain transfer agent can be any catalytic chain transfer agent which reduces molecular weight of addition polymers during free radical polymerization of vinyl monomers. Examples of catalytic chain transfer agents include, for example, cobalt complexes (e.g., cobalt (II) chelates). Catalytic chain transfer agents can often be utilized in relatively low concentrations relative to thiol-based CTAs.

Examples of preferred chain transfer agents include octyl mercaptan, n-dodecyl mercaptan (DDM), t-dodecyl mercaptan, hexadecyl mercaptan, octadecyl mercaptan (ODM), isooctyl 3-mercaptopropionate (IMP), butyl 3-mercaptopropionate, 3-mercaptopropionic acid, butyl thioglycolate, isooctyl thioglycolate, dodecyl thioglycolate, and the like. The chain transfer agents can be added to a monomer reaction mixture preferably in amounts of up to about 10 weight percent of polymerizable monomer mixture, based on total monomer mixture weight.

The inventive ASAP can be manufactured by conventional polymerization techniques, such as emulsion polymerization, as is known in the polymer art. Typically the polymerization process is carried out at a reaction temperature in the range of about 30 to about 95° C., however, higher or lower temperatures can be used. To facilitate emulsification of the monomer mixture, the emulsion polymerization can be carried out in the presence of anionic surfactants, such as fatty alcohol sulfates or alkyl sulfonates, nonionic surfactants, such as linear or branched alcohol ethoxylates, amphoteric surfactants, or mixtures thereof. The emulsion polymerization reaction mixture also includes one or more free radical initiators, preferably in an amount in the range of about 0.01 to about 3 weight percent based on total monomer weight. The polymerization can be performed in an aqueous or aqueous alcohol medium at a low pH, i.e., preferably not more than about pH 4.5.

Anionic surfactants suitable for facilitating emulsion polymerizations are well known in the polymer art, and include sodium lauryl sulfate, sodium dodecyl benzene sulfonate, disodium laureth-3 sulfosuccinate, sodium dioctyl sulfosuccinate, sodium di-sec-butyl naphthalene sulfonate, disodium dodecyl diphenyl ether sulfonate, disodium n-octadecyl sulfosuccinate, phosphate esters of branched alcohol ethoxylates, and the like.

Exemplary free radical initiators include, without being limited thereto, the water-soluble inorganic persulfate compounds, such as ammonium persulfate, potassium persulfate, and sodium persulfate; peroxides, such as hydrogen peroxide, benzoyl peroxide, acetyl peroxide, and lauryl peroxide; organic hydroperoxides, such as cumene hydroperoxide and t-butyl hydroperoxide; organic peracids, such as peracetic acid and perbenzoic acid (optionally activated with reducing agents, such as sodium bisulfite or ascorbic acid); and oil soluble, free radical producing agents, such as 2,2'-azobisisobutyronitrile, and the like. Particularly suitable free-radical polymerization initiators include water soluble azo polymerization initiators, such as 2,2'-azobis(tert-alkyl) compounds having a water solubilizing substituent on the alkyl group. Preferred azo polymerization catalysts include the VAZO® free-radical polymerization initiators, available from DuPont, such as VAZO® 44 (2,2'-azobis(2-(4,5-dihydroimidazolyl)propane), VAZO® 56 (2,2'-azobis(2-methylpropionamidine) dihydrochloride), and VAZO® 68 (4,4'-azobis(4-cyanovaleric acid)).

Optionally, other emulsion polymerization additives, which are well known in the emulsion polymerization art, such as buffering agents, chelating agents, inorganic electrolytes, chain terminators, and pH adjusting agents can be included in the polymerization system.

A preferred general emulsion polymerization procedure for the preparation of alkali-swellable or alkali-soluble associated polymers of the present invention is provided below:

A monomer emulsion is prepared in a first reactor equipped with a nitrogen inlet and an agitator, by combining a desired amount of each monomer in water containing an emulsifying amount of an anionic surfactant under a nitrogen atmosphere and with mixing agitation. To a second reactor equipped with an agitator, nitrogen inlet and feed pumps, are added a desired amount of water and additional anionic surfactant, if desired, under a nitrogen atmosphere, and the contents of the second reactor are heated with mixing agitation. After the contents of the second reactor reach a temperature in the range of about 65-98° C., a free radical initiator is injected into the so-formed aqueous surfactant solution in the second reactor, and the monomer emulsion from the first reactor is then gradually pumped into the second reactor over a period of typically in the range of about one to about four hours at a controlled reaction temperature in the range of about 65-95° C. After completion of the monomer addition, an additional quantity of free radical initiator can be added to the second reactor, if desired, and the resulting reaction mixture is typically held at a temperature of about 75-95° C. for a time period sufficient to complete the polymerization reaction. The resulting polymer emulsion can then be cooled and discharged from the reactor.

One skilled in the polymer arts will recognize that the amounts of each monomer component can be adjusted to obtain polymers having any desired ratio of monomers. Larger or smaller proportions of water may also be utilized, as desired. Water miscible solvents, such as alcohols, and other polymerization additives, as described above, may also be included in the reaction mixture. Nonionic surfactants, such as linear or branched alcohol ethoxylates, can also be added as is known in the emulsion polymerization art.

The product polymer emulsions can be prepared to preferably contain about 1 percent to about 60 percent total polymer solids, more preferably about 10 percent to about 50 percent total polymer solids, most preferably about 15 percent to about 45 percent total polymer solids (TS) based on the weight of the polymer.

Prior to any neutralization, the polymer emulsions, as produced, typically have a pH in the range of about 2 to not more than about 5.5, a Brookfield viscosity of not more than about 100 milli-Pascal seconds (mPa·s) at ambient room temperature (spindle #2, 20 rpm) and a glass transition temperature (Tg) of not more than about 150° C. as determined by Method C below.

Optionally, the produced polymer emulsions can be further processed by adjusting the pH to a value preferably in the range of about 3 to about 7.5 or greater, if an alkaline pH is desired, with alkaline materials, preferably alkali metal hydroxides, organic bases, and the like. The polymer emulsions typically swell to a viscosity greater than about 100 mPa·s and form viscous solutions or gels at neutral to alkaline pH, and the polymers are generally substantially stable at such pH values, even at pH values greater than about 12. The polymer emulsions can be diluted with water or solvent, or concentrated by evaporation of a portion of the water. Alternatively, the obtained polymer emulsion may be substantially dried to a powder or crystalline form by utilizing equipment well known in the art, such as, for example, a spray drier, a drum drier, or a freeze drier.

The inventive ASAP can be prepared by emulsion polymerization and utilized by incorporating various known additives and conventional adjuvants, and solvents other than water, into the ASAP emulsion product, as needed, to achieve the intended form for use of the final composition without altering or adversely affecting the performance or properties of the ASAP. Alternatively, the ASAP can be incorporated as an ingredient into a formulation, preferably in a liquid form, employing conventional mixing equipment.

The ASAP of this invention can be employed as a film former. When the glass transition temperature (Tg) of a selected ASAP film former is substantially above ambient room temperature, the Tg of the ASAP film former can be adjusted to achieve a desired Tg by including additives in the formulation, such as coalescing agents, plasticizers and mixtures thereof. Such additives can assist in film formation by lowering the Tg of the ASAP to the ambient room temperature or desired temperature.

The inventive ASAP can be utilized, for example, without being limited thereto, as a rheology modifier, suspending agent, film former, thickener, stabilizer, emulsifier, solubilizer, and the like, in formulated compositions for personal care products, topical health care products, household care products, institutional and industrial (I&I) products and industrial processes. The foregoing products can typically contain various additives and conventional adjuvants as are well known in the art, including, without being limited thereto, acidifying or alkalizing pH adjusting agents and buffering agents; fixatives and film formers, such as gums, resins, polymers of synthetic or natural origin, and the like; auxiliary rheology modifiers, such as viscosity-increasing polymeric thickeners or gellants, additives, such as emulsifiers, emulsion stabilizers, waxes, dispersants, and the like, and viscosity control agents, such as solvents, electrolytes, and the like; hair and skin conditioning agents, such as antistatic agents, synthetic oils, vegetable or animal oils, silicone oils, monomeric or polymeric quaternized ammonium salts, emollients, humectants, lubricants, sunscreen agents, and the like; chemical hair waving or straightening agents; hair colorants, such as pigments and dyes for temporary, semipermanent, or permanent hair dyeing; surfactants, such as anionic, cationic, nonionic, amphoteric and zwitterionic surfactants; polymer film modifying agents, such as plasticizers, humectants, tackifiers, detackifiers, wetting agents and the like, product finishing agents, such as chelating agents, opacifiers, pearlescing agents, preservatives, fragrances, solubilizers, colorants, such as pigments and dyes, UV absorbers, and the like; propellants (water-miscible or water-immiscible), such as fluorinated hydrocarbons, liquid volatile hydrocarbons, compressed gases, and the like; and mixtures thereof.

In one preferred embodiment, an aqueous gel formulation comprising an ASAP of the present invention also includes a $C_1$-$C_8$ monohydric alcohol such as methanol, ethanol, isopropanol, hexanol, benzyl alcohol, and the like, or a $C_3$-$C_8$ polyol such as ethylene glycol, propylene glycol, glycerin, hexylene glycol, butylene glycol, inositol, sorbitol, mannitol, and the like. The amount of ASAP employed is not limited, as long as the purpose and properties of the compositions containing the ASAP perform their intended function. A useful amount of active weight percent ASAP can be in the range of about 0.01% to about 25%, preferably about 0.05% to about 20%; more preferably about 0.1% to about 15%.

In a preferred alkali-swellable ASAP embodiment, a concentration of about 1 active weight % ASAP in deionized water, in its neutralized or anionic form at a pH in the range of about 3 to about 9, can provide a Brookfield viscosity ranging from about 100 mPa·s to 100,000 mPa·s or more (Brookfield RVT, 20 rpm, at about 25° C. ambient room temperature). In a preferred alkali-soluble ASAP embodiment, a concentration of about 5 active weight % ASAP in deionized water or in a hydroalcoholic medium, in its neutralized form at a pH in the range of about 5.5 to about 8.5 provides a Brookfield viscosity preferably of not more than about 1000 mPa·s.

While the ASAP minimize or eliminate the need for added thickeners, the ASAP can be used in combination with conventional polymeric thickeners, such as natural gums, resins, polysaccharides, synthetic polymeric thickeners, and the like, popularly used in the art. It is known that the viscosity obtained with anionic polymers, such as alkali-swellable carbomer polymer, commonly employed as a thickener or as a drug carrier in medicaments, can be negatively affected by the presence of anionic polymer. Surprisingly, it was found that the ASAP were compatible with either traditional carbomer polymer or with hydrophobically-modified carbomer polymer and the viscosity produced by such combinations was unexpectedly higher than the sum of the viscosities of alkali-swellable ASAP and carbomer polymer by themselves at the same concentrations. This beneficially allows the use of alkali-swellable ASAP in formulations containing carbomer polymer or hydrophobically modified carbomer polymer, if desired, to further enhance the aesthetic and rheological properties of the formulation.

Concentrated additives, adjuvant ingredients, products or materials that can be employed with the inventive polymers are referred to herein by the international nomenclature commonly known to as INCI name given them in the *International Cosmetic Ingredient Dictionary*, Volumes 1 and 2, Sixth Edition, (1995), or *International Cosmetic Ingredient Dictionary and Handbook*, Volumes 1-3, Seventh Edition, (1997), both published by the Cosmetic, Toiletry, and Fragrance Association, Washington D.C. (both hereafter INCI Dictionary), or by their commonly used chemical names. Numerous commercial suppliers of materials that can be employed, listed by INCI name, trade name or both can be found in the INCI Dictionary and in numerous commercial trade publications, including but not limited to the 2001 *McCutcheon's* Directories, Volume 1: Emulsifiers & Detergents and Volume 2: Functional Materials, published by McCutcheon's Division, The Manufacturing Confectioner Publishing Co. Glen Rock, N.J. (2001); and 2001 *Cosmetic Bench Reference*, edition of *COSMETICS & TOILETRIES®*, 115 (13), published by Allured Publishing Corporation, Carol Stream, Ill. (2001); the relevant disclosures of the INCI Dictionary and each of the foregoing publications being incorporated herein by reference.

Compositions for personal care and topical health care can comprise any cosmetic, toiletry, and topical pharmaceutical formulation that requires rheology modification or thickening known from the cosmetic and pharmaceutical literature. Typical personal care formulations that can include the ASAP as a rheology modifier include, without being limited thereto, shampoos, chemical and non-chemical hair curling and hair straightening products, hair style maintenance products, emulsion lotions and creams for the nails, hands, feet, face, scalp, and body, hair dyes, face and body makeup, nail care products, astringents, deodorants, antiperspirants, depilatories, skin-protective creams and lotions, such as sunscreens, skin and body cleansers, skin conditioners, skin toners, skin firming compositions, liquid soaps, soap bars, bath products, shaving products, and the like. Formulated compositions for topical health care that are applied to the skin and mucous membranes for cleansing or soothing are compounded with many of the same physiologically tolerable cosmetic ingredients and chemically inert ingredients employed for personal care products in the same product forms, differing primarily in the purity grade of ingredients and by the presence of topically active medicaments. For example, topical health care products include oral hygiene products, such as toothpastes, oral suspensions, and mouth care products, which can be classified as pharmaceuticals or over-the-counter products, and include pharmacosmetics, which contain phytopharmaceutic or nutraceutical ingredients.

Compositions for personal care and topical health care can be in the form of, without being limited thereto, liquids, such as rinses, gels, sprays, emulsions, such as lotions and creams, shampoos, pomades, foams, ointments, tablets, sticks, such as lip care products, makeup, and suppositories, and like products, which are applied to skin and hair and remain in contact therewith until removed as by rinsing with water or washing with shampoo or soap. Gels can be soft, stiff, or squeezable. Emulsions can be oil-in-water, water-in-oil, or multiphase. Sprays can be non-pressurized aerosols delivered from manually pumped finger-actuated sprayers or can be pressurized aerosols. The ASAP can be formulated in an aerosol composition, such as in a spray, mousse, or foam forming formulation, where a chemical or gaseous propellant is required. Physiologically and environmentally tolerable propellants, such as compressed gases, fluorinated hydrocarbons and liquid volatile hydrocarbons, and the amounts and suitable combinations to be used, are well known in the cosmetic and pharmaceutical art and literature.

An extensive listing of personal care and cosmetic ingredients and their functions, for example, appears in the INCI Dictionary, generally, and in Vol. 2, Section 4 of the Seventh Edition, in particular, incorporated herein by reference. Those skilled in the art of formulating personal care and health care products recognize that some ingredients are multifunctional and, hence, can serve more than one purpose in the formulation. Thus, the amount of ASAP polymer employed as a personal care or health care product component is not limited, as long as the purpose and properties of the formulated composition performs its intended function.

Typical household care, and I&I care products that can contain ASAP as a rheology modifier include, without being limited thereto, surface cleansers for kitchen and bathroom counter tops, tiled surfaces, and utilities, including appliances employed or located therein, toilet cleaners, including toilet bowl rim gels, floor cleansers, wall cleansers, polishes, air freshener gels, detergents, treatments and cleansers for dishes and laundry, such as fabric softener, spot reducer, fabric treatments, and the like.

The ASAP are suitable for use as rheology modifiers in industrial processes and applications. For example, the ASAP can be employed in textile treatments as processing and finishing aids for textile coating, printing and finishing formulations, inks, metal cleaners, scale removers, paint and varnish strippers, polishes for furniture, shoes, cars, or metal, and the like.

Thus, compositions containing ASAP can be in any form, including but not limited to, a liquid, a gel, a spray, an emulsion, a semisolid, such as a paste, a solid, such as a stick, tablet or bar, and the like, so long as the composition is useful for its intended function.

The following examples further illustrate the preparation and use of preferred embodiments but are not intended to be limiting.

Materials and Procedures

The materials are generally commercially available from chemical supply houses known to those skilled in the chemical arts or from the supplier indicated.

1. Materials Abbreviations and Trade Names

| | |
|---|---|
| EA | Ethyl acrylate |
| WAM | Methacrylamidoethyl-N-ethyleneurea (SIPOMER ® WAM II, Rhodia, Inc.) |
| MAA | Methacrylic acid |
| MMA | Methyl methacrylate |
| AA | Acrylic acid |
| SSSA | Sodium salt of styrene sulfonic acid |
| BEM25 | Beheneth-25 methacrylate |
| LEM23 | Laureth-23 methacrylate |
| CSEM25 | Ceteareth-25 methacrylate |
| HCOEM25 | Hydrogenated castor oil ethoxylated (25) methacrylate |
| HCOEM16 | Hydrogenated castor oil ethoxylated (16) methacrylate |
| TEM25 | Tristyrylphenol ethoxylated (25) methacrylate |
| CHEM24 | Choleth-24 methacrylate |
| CEM24 | Ceteth-24 methacrylate |
| EOBDMA | Ethoxylated (30) bisphenol A dimethacrylate |
| TMPTA | Trimethylolpropane triacrylate |
| IMP | Isooctyl 3-mercaptopropionate |
| DDM | Dodecyl mercaptan |
| ODM | Octadecyl mercaptan |
| R307 | A randomly ethoxylated/propoxylated 1,4-butanediol vinyl ether having the empirical formula $CH_2=CH-O-(CH_2)_4-O-(C_3H_6O)_4-(C_2H_4O)_{30}-H$ (EMULSOGEN ® R307, Clariant Corporation) |
| BX-AA | A randomly ethoxylated/propoxylated allyl ether having the empirical formula $CH_2=CH-CH_2-O-(C_3H_6O)_5-(C_2H_4O)_5-H$ (BX-AA-E5P5, Bimax, Inc.) |
| M5010 | A carboxy-functional $C_{12}$-$C_{15}$ alkenyl hydrophobe, ethoxylated with about 24 ethylene oxide units (MAXEMUL ® 5010, Uniqema) |
| MPEG35 | Methoxy ethoxylated (35) methacrylate |
| MPEG55 | Methoxy ethoxylated (55) methacrylate |

2. Methods

A. Viscosity. The reported viscosity of each polymer containing composition was measured in milli-Pascal seconds (mPa·s), employing a Brookfield rotating spindle viscometer, (Brookfield, Model RVT) at about 20 revolutions per minute (rpm), at ambient room temperature of about 20-25° C. (hereafter referred to as Brookfield viscosity). Viscosity was measured on freshly prepared compositions (referred to as "initial viscosity", and re-measured after allowing the composition to age for at least about 24 hours at ambient room temperature (referred to as "24-hour viscosity"). Where only one viscosity value is shown below, the viscosity value is the 24-hour viscosity, unless otherwise indicated.

A "thin viscosity" typically refers to a pourable, runny, sprayable, product having a viscosity of up to about 1,000 mPa·s; a "medium viscosity" refers to a product having a viscosity in the range of above 1,000 to about 3,000 mPa·s; a "high viscosity" refers to a product having a viscosity in the range of above 3,000 to about 10,000 mPa·s; and gel refers to a product having a viscosity greater than 10,000 mPa·s, unless otherwise indicated.

B. Clarity. When reported, the clarity of the polymer-containing composition was measured in % T (transmittance) by Brinkmann PC 920 calorimeter at least about 24 hours after the composition was made. Clarity measurements were taken against deionized water (clarity rating of 100%). Compositions having a clarity of about 60% or more were substantially clear; compositions having a clarity in the range of about 45-59% were judged substantially translucent.

C. Glass transition temperature. When reported, the glass transition temperature (Tg) of the associative polymer was determined by casting a portion of the product emulsion on a MYLAR® (polyethylene terephthalate) film substrate using a 10 mil opening draw-down bar, drying the cast film at ambient room temperature (about 25° C.) for about 24 hours, and then measuring the $T_g$ by well known Differential Scanning Calorimetry (DSC) technique.

D. Gloss. When reported, the gloss of the associative polymer film was determined by casting a film of the polymer product on a Leneta Form 2C-opacity chart (Leneta Co.) using a 10 mil opening draw down bar, drying the cast film at about 25° C. (about 77° F.) for about 24 hours, and then instrumentally measuring the specular gloss of the dried film at a reflectance angle of 20° and 60° geometry employing a Micro-Tri-Gloss glossmeter, (Byk/Gardner, Silver Spring, Md.) using the Standard Test Method for Specular Gloss, ASTM 523-89 (Reapproved 1994). A specular gloss value of 100 units was assigned to the standard for each geometry. A specular gloss value unit reading of at least about 30 at an angle of 20° and at least about 80 at an angle of 60° was judged glossy and a value of less than 25 at either angle was judged dull.

E. Turbidity. When reported, the turbidity of a polymer-containing composition was determined in Nephelometric Turbidity Units (NTU) employing a nephelometric turbidity meter with distilled water (NTU=0) as the standard. Compositions having an NTU value of about 90 or greater were judged turbid.

F. Humidity Resistance—Percent curl retention. The resistance of a polymer to high humidity (about 90% Relative Humidity (RH)) was measured by its ability to hold a curl set on hair after absorption of water from the applied composition and from the surrounding atmosphere employing the well known technique commonly referred to as high humidity curl retention (HHCR). Descriptions of the HHCR methodology are readily found in the cosmetic literature. See, for example, Ch. 30, *Harry's Cosmeticology*, 8*th Ed.*, M. J. Rieger, Ph.D. (ed.), 666-667, Chemical Publishing Co., Inc., New York, N.Y. (2000), and Diaz et al., *J. Soc. Cosmet. Chem.*, 34, 205-212 (July 1983), the relevant disclosures of each are incorporated herein by reference.

Tresses of commercially blended Caucasian untreated (virgin) human hair were prepared employing natural brown or black color European hair supplied by International Hair Importers and Products Inc., New York. Each hair tress (about 3 grams weight) was about 7 inches (about 18 cm) in length and was anchored with glue at the scalp (root) end portion. Prior to use, each hair tress was pre-cleaned by washing with a dilute aqueous solution of sodium lauryl sulfate (10% SLS), followed by thorough rinsing with deionized water at ambient room temperature and dried with towel blotting. The initial extended length of the hair ($L_e$) was measured. About 0.8 grams of polymer-containing composition to be evaluated was applied to the hair tress and distributed uniformly from the scalp to end portion. The treated hair tress was then wrapped around a hair curler having an outer diameter of about 3 cm, and dried on the curler overnight at an ambient room temperature of about 21-23° C. (about 71-73° F.). After drying, the curler was carefully removed, leaving the hair styled into a single curl, the initial length of the hair curl ($L_i$) was measured, and the curled hair tress was vertically hung in a humidity chamber set at an ambient temperature of about 26-27° C. and ambient high humidity of about 90% RH.

The resistance to high humidity, based on percent curl retention (HHCR) was determined by measuring the length of the hair curl as the curl relaxed after selected intervals ($L_t$) of exposure to humidity. The following equation was used to calculate percent curl retention, relative to the initial curl length ($L_i$) and length of the fully extended hair, before curling ($L_e$).

$$\% \text{ Curl Retention} = \frac{L_e - L_t}{L_e - L_i} \times 100$$

The change in curl length (droop, helix formation) was periodically measured and monitored over a period in the range of about 4 to about 24 hours with a final reading being taken after about 24 hours. A retention of about 70% or more curl (HHCR) for a minimum period of about 0.75 hours at about 90% RH is a conventional benchmark for good high humidity resistance, and an HHCR greater than 70% after a period of at least about 3 hours is judged very good to excellent.

G. Subjective Properties Assessment. The tactile, aesthetic and mechanical properties of hair treated with polymer-containing composition, such as feel, flaking, ease of combing, curl memory, such as bouncy/curl-up, and static flyaway were subjectively assessed. Feel was assessed by the psychosensory tactile characteristics of the polymer-containing product (tackiness, smoothness, and the like) while being hand applied to hair. Flaking of polymer on the hair, if any, was assessed by inspecting the hair for visible deposit (coating) on the hair surface and by combing the treated hair and then inspecting the tines of the comb for visible residue. Combing ease and static flyaway of the hair was subjectively assessed during combing by noting hair tangles, flyaway fibers and difficulty in combing through the hair. Curl memory was subjectively assessed by observing the bouncy, curl-up appearance of the hair curl pattern (i.e., complete curl, open helix or spiraling or loss of curl) remaining in the hair after exposure to high humidity of about 90% RH.

H. Methods of Preparing Associative Polymers. A general emulsion polymerization procedure preparation of alkali-swellable associative polymers of the present invention is provided below:

A monomer emulsion is prepared in a first reactor equipped with a nitrogen inlet and an agitator, by combining a desired amount of each monomer in water containing an emulsifying amount of an anionic surfactant under a nitrogen atmosphere, with mixing agitation. To a second reactor equipped with a mixing agitator, nitrogen inlet and feed pumps, are added a desired amount of water and additional anionic surfactant, if desired, and the contents are heated under a nitrogen atmosphere with mixing agitation. After the second reactor reaches a temperature in the range of about 80-90° C., a desired amount of a free radical initiator is injected into the surfactant solution in the second reactor, and the monomer emulsion from the first reactor is then gradually pumped into the second reactor over a period in the range of about one to about four hours at a controlled reaction temperature in the range of about 80-90° C. After completion of the monomer addition, an additional quantity of free radical initiator can be added to the second reactor, if desired, and the resulting reaction mixture is held at a temperature of about 90-95° C. for a time period sufficient to complete the polymerization reaction, typically about 90 minutes. The resulting polymer emulsion can then be cooled and discharged from the reactor.

I. Methods for Preparing Polymer-Containing Compositions. For illustration, and not by limitation, product ASAP emulsions prepared according to the general Method H above were employed for preparing the compositions in the following examples. Unless otherwise indicated, the product ASAP emulsions were diluted with water to obtain the desired polymer concentration or were added to a formulation with the water soluble ingredients in an amount sufficient to provide the desired polymer concentration in the finished formulation. All references to weight % polymer means active weight % polymer on a total formulation weight basis. Unless otherwise indicated, formulations are prepared employing conventional formulation techniques well known to those skilled in the formulation arts. The inventive polymers were suitable for use as rheology modifiers, film-formers, thickeners, suspending agents and the like as illustrated in the following examples.

EXAMPLE 1

Polymers

The alkali-swellable associative polymer, identified as Polymer A in Table 2A, was prepared according to the general procedure described as Method H, and as described in detail below.

A monomer reaction mixture was prepared in a first reactor, under a nitrogen atmosphere, using an agitator mixer rotating at about 500 rpm, by combining about 117 parts by weight of methacrylic acid, about 172 parts by weight of ethyl acrylate, about 25.5 parts by weight of BEM25, and about 3.2 parts by weight of LEM23 into about 92 parts by weight of deionized water containing about 10.6 parts by weight of 30% aqueous sodium lauryl sulfate. To a second reactor, equipped with a mixing agitator, nitrogen inlet and feed pumps, were added about 570 parts by weight of deionized water and about 3.2 parts by weight of 30% aqueous sodium lauryl sulfate. The contents of the second reactor were heated with mixing agitation at a rotation speed of about 200 rpm under a nitrogen atmosphere. After the contents of the second reactor reached a temperature in the range of about 85-88° C., about 6.3 parts of 3.5% ammonium persulfate solution (a free radical initiator) was injected into the so-formed hot surfactant solution in the second reactor. The aqueous emulsion of the monomer mixture from the first reactor was gradually pumped into the second reactor over a period of about 60 minutes at a controlled reaction temperature in the range of about 85-88° C. At the completion of the monomer mixture addition, about 9.4 parts by weight of 0.7% ammonium persulfate solution was added to the reaction mixture in the second reactor and the temperature of the reaction was maintained at about 90° C. for an additional one and half hours to complete polymerization. The resulting ASAP emulsion was cooled to room temperature, discharged from the reactor and collected.

Comparative HASE Polymers, CP-1 through CP-6, each having the monomer components shown in Table 1, the inventive alkali-swellable ASAP, Polymers B-M, N-Z and AA-AW, and alkali-soluble ASAP, Polymers BA-BL, each having the monomer components shown, respectively, in Tables 2A, 2B, 2C, and 2D, respectively, were prepared following the general method for the preparation of Polymer A, above. All monomers listed for a given polymer, were included in the monomer reaction mixture in the first reactor and the amounts of the monomers were adjusted, as needed, to achieve the monomer weight percent values listed in Tables 1, 2A, 2B, and 2C; all % values in the tables are weight percent, based on total monomer mixture weight.

All of the polymers were prepared as aqueous solutions having total solids levels in the range of about 30 to about 45%. In most cases, sodium lauryl sulfate (SLS) was utilized as the emulsifying surfactant for the polymerization reaction. In addition, Polymer AV was also successfully prepared according to the foregoing procedure utilizing a combination of SLS and nonionic emulsifying surfactant, i.e., Ceteareth-20 (INCI name for polyoxyethylene (20) cetyl/stearyl ether). In the preparations of Polymers BH, BK, and BL, the following surfactants were utilized in place of SLS, respectively: RHODAFAC® 610 (a complex phosphate ester of a branched alcohol ethoxylate, available from Rhodia, Inc., Cranbury, N.J.), disodium laureth-3-sulfosuccinate, and sodium dioctyl sulfosuccinate.

TABLE 1

Comparative HASE Polymer Compositions

| Polymer No. | Acidic Vinyl Monomer (%) | Nonionic Vinyl Monomer (%) | Associative Monomer(s) (%) | Other Monomer(s) (%) |
|---|---|---|---|---|
| CP-1 | MAA (37) | EA (53.7) | BEM25 (9) | EOBDMA (0.3) |
| CP-2 | MAA (37) | EA (53) | BEM25 (10) | |
| CP-3 | MAA (37) | EA (59.7) | BEM25 (3) | TMPTA (0.3) |
| CP-4 | MAA (37) | EA (53.55) | BEM25 (8); CSEM25 (1) | EOBDMA (0.3); IMP (0.15) |
| CP-5 | MAA (36) | EA (60.9) | BEM25 (3) | TMPTA (0.1) |
| CP-6 | MAA (37) | EA (53.7) | BEM25 (9) | Diallyl phthalate (0.3) |

TABLE 2A

Inventive Polymer Compositions

| Poly. No. | Acidic Vinyl Monomer(s) (%) | Nonionic Vinyl Monomer(s) (%) | Associative Monomers (%) | Optional Monomer(s) (%) |
|---|---|---|---|---|
| A | MAA (37) | EA (54) | BEM25 (8); LEM23 (1) | |
| B | MAA (34); AA (2) | EA (55.85); WAM (3) | BEM25 (4); LEM23 (1) | TMPTA (0.1); EOBDMA (0.05) |
| C | MAA (37) | EA (53.7) | BEM25 (8); LEM23 (1) | EOBDMA (0.3) |
| D | MAA (37) | EA (53.7) | BEM25 (8); HCOEM25 (1) | EOBDMA (0.3) |
| E | MAA (37) | EA (53.7) | BEM25 (8); HCOEM16 (1) | EOBDMA (0.3) |
| F | MAA (37) | EA (53.7) | BEM25 (8); TEM25 (1) | EOBDMA (0.3) |

TABLE 2A-continued

Inventive Polymer Compositions

| Poly. No. | Acidic Vinyl Monomer(s) (%) | Nonionic Vinyl Monomer(s) (%) | Associative Monomers (%) | Optional Monomer(s) (%) |
|---|---|---|---|---|
| G | MAA (37) | EA (53.85) | BEM25 (8); LEM23 (1) | IMP (0.15) |
| H | MAA (37) | EA (53.55) | BEM25 (8); LEM23 (1) | EOBDMA (0.3); IMP (0.15) |
| I | MAA (37) | EA (53.85) | BEM25 (8); LEM23 (1) | ODM (0.15) |
| J | MAA (37) | EA (53.55) | BEM25 (8); LEM23 (1) | ODM (0.15); EOBDMA (0.3) |
| K | MAA (37) | EA (57.9) | BEM25 (4); LEM23 (1) | TMPTA (0.1) |
| L | MAA (37) | EA (53.7) | BEM25 (6); LEM23 (3) | EOBDMA (0.3) |
| M | MAA (37) | EA (57.7) | BEM25 (4); LEM23 (1) | TMPTA (0.15); EOBDMA (0.15) |

TABLE 2B

Inventive Polymer Compositions

| Poly. No. | Acidic Vinyl Monomer (%) | Nonionic Vinyl Monomer (%) | Associative Monomer(s) (%) | SH Monomer(s) (%) | Optional Monomer(s) (%) |
|---|---|---|---|---|---|
| N | MAA (37) | EA (59.7) | CHEM24 (1.5); CEM24 (1.5) | | EOBDMA (0.3) |
| O | MAA (37) | EA (56.7) | BEM25 (3); CHEM24 (1.5); CEM24 (1.5) | | EOBDMA (0.3) |
| P | MAA (37) | EA (59.9) | BEM25 (2); LEM23 (1) | | TMPTA (0.1) |
| Q | MAA (36) | EA (58.1) | BEM25 (2); LEM23 (1) | R307 (2.8) | TMPTA (0.1) |
| R | MAA (35) | EA (58.9) | BEM25 (2); LEM23 (1) | M5010 (3) | TMPTA (0.1) |
| S | MAA (35) | EA (56.9) | BEM25 (2); LEM23 (1) | R307 (3); M5010 (2) | TMPTA (0.1) |
| T | MAA (37) | EA (42.8) | BEM25 (15); LEM23 (5) | | TMPTA (0.05); EOBDMA (0.15) |
| U | MAA (37) | EA (57.8) | BEM25 (4); LEM23 (1) | | TMPTA (0.2) |
| V | MAA (37) | EA (53.7) | BEM25 (3); LEM23 (6) | | EOBDMA (0.3) |
| W | MAA (37) | EA (53.7) | BEM25 (4.5); LEM23 (4.5) | | EOBDMA (0.3) |
| X | MAA (36) | EA (55.9) | BEM25 (2); LEM23 (1) | BX-AA (5) | TMPTA (0.1) |
| Y | MAA (36) | EA (54.9) | BEM25 (3); LEM23 (1) | R307 (5) | TMPTA (0.1) |
| Z | MAA (36) | EA (55.9) | BEM25 (2); LEM23 (1) | R307 (5) | TMPTA (0.1) |

TABLE 2C

Inventive Polymer Compositions

| Poly. No. | Acidic Vinyl Monomer(s) (%) | Nonionic Vinyl Monomer(s) (%) | Associative Monomer(s) (%) | SH Monomer (%) | Optional Monomer (%) |
|---|---|---|---|---|---|
| AA | MAA (37); SSSA (5) | EA (51) | BEM25 (6); LEM23 (1) | | |
| AB | MAA (36) | EA (55.2) | BEM25 (2.5); CHEM24 (0.5); CEM24 (0.5) | R307 (5) | EOBDMA (0.3) |
| AC | MAA (52); AA (2) | EA (42.7) | BEM25 (2); LEM23 (1) | | EOBDMA (0.3) |
| AD | MAA (36) | EA (48.7) | BEM25 (10); LEM23 (5) | | EOBDMA (0.3) |
| AE | MAA (37) | EA (59.7) | BEM25 (2); LEM23 (1) | | EOBDMA (0.3) |

TABLE 2C-continued

Inventive Polymer Compositions

| Poly. No. | Acidic Vinyl Monomer(s) (%) | Nonionic Vinyl Monomer(s) (%) | Associative Monomer(s) (%) | SH Monomer (%) | Optional Monomer (%) |
|---|---|---|---|---|---|
| AF | MAA (36) | EA (58.4) | BEM25 (3) | R307 (2.5) | TMPTA (0.1) |
| AG | MAA (36) | EA (55.9) | BEM25 (3) | R307 (5) | TMPTA (0.1) |
| AH | MAA (36) | EA (53.4) | BEM25 (3) | R307 (7.5) | TMPTA (0.1) |
| AI | MAA (36) | EA (45.9) | BEM25 (3) | R307 (15) | TMPTA (0.1) |
| AJ | MAA (37) | EA (53.7) | BEM25 (8) | MPEG35 (1) | EOBDMA (0.3) |
| AK | MAA (37) | EA (53.7) | BEM25 (8) | MPEG55 (1) | EOBDMA (0.3) |
| AL | MAA (2.5); AA (31) | EA (57.5) | BEM25 (8) | MPEG55 (1) | |
| AM | MAA (36) | EA (57.9) | BEM25 (2); CHEM24 (0.5); CEM24 (0.5) | R307 (3) | TMPTA (0.1) |
| AN | MAA (35) | EA (56.9) | BEM25 (4); LEM23 (1) | M5010 (3) | TMPTA (0.1) |
| AO | MAA (36) | EA (52.9) WAM (3) | BEM25 (4); LEM23 (1) | BX-AA (3) | TMPTA (0.1) |
| AP | MAA (36) | EA (50.9) WAM (3) | BEM25 (4); LEM23 (1) | BX-AA (5) | TMPTA (0.1) |
| AQ | MAA (36) | EA (53.85) | BEM25 (4); LEM23 (1) | BX-AA (5) | TMPTA (0.15) |
| AR | MAA (37) | EA (48.8) | CSEM25 (9) | BX-AA (5) | TMPTA (0.2) |
| AS | MAA (36) | EA (54.7) | BEM25 (8); LEM23 (1) | | TMPTA (0.3) |
| AT | MAA (37) | EA (51.8) | CSEM25 (10) | BX-AA (1) | TMPTA (0.2) |
| AU | MAA (37) | EA (51.8) | CSEM25 (10) | R307 (1) | TMPTA (0.2) |
| AV | MAA (37) | EA (52.8) | CSEM25 (8) | BX-AA (2) | TMPTA (0.2) |
| AW | MAA (47) | EA (46.8) | CSEM25 (4) | BX-AA (2) | TMPTA (0.2) |

TABLE 2D

Inventive Polymer Compositions

| Poly. No. | Acidic Vinyl Monomer(s) (%) | Nonionic Vinyl Monomer(s) (%) | Associative Monomer(s) (%) | SH Monomer (%) | Chain Transfer Agent (%) |
|---|---|---|---|---|---|
| BA | MAA (29) | EA (43.2); MMA (19.5) | BEM25 (2.5); LEM23 (1) | R307 (2); M5010 (2) | DDM (0.8) |
| BB | MAA (28.64) | EA (44.44); MMA (19.26) | BEM25 (2.47) | R307 (1.975); M5010 (1.975) | DDM (1.24) |
| BC | MAA (28.64) | EA (44.44); MMA (19.26) | LEM25 (2.47) | R307 (1.975); M5010 (1.975) | DDM (1.24) |
| BD | MAA (28.64) | EA (44.44); MMA (19.26) | CSEM25 (2.47) | R307 (1.975); M5010 (1.975) | DDM (1.24) |
| BE | MAA (25) | EA (47.74); MMA (19.5) | BEM25 (2.5) | R307 (2); M5010 (2) | DDM (1.26) |
| BF | MAA (29) | EA (43.74); MMA (19.5) | LEM25 (2.5) | R307 (2); M5010 (2) | DDM (1.26) |
| BG | MAA (29) | EA (43.74); MMA (19.5) | CSEM25 (2.5) | R307 (2); M5010 (2) | DDM (1.26) |
| BH | MAA (24.78) | EA (48.56); MMA (19.33) | BEM25 (2.48) | R307 (1.98); M5010 (1.98) | DDM (0.89) |
| BI | MAA (25) | EA (50.74); MMA (19.5) | BEM25 (2.5) | M5010 (1) | DDM (1.26) |
| BJ | MAA (25) | EA (50.74); MMA (19.5) | BEM25 (2.5) | BX-AA (1) | DDM (1.26) |
| BK | MAA (17.5) | EA (52.74); MMA (25) | BEM25 (2.5) | BX-AA (1) | DDM (1.26) |
| BL | MAA (25) | EA (50.74); MMA (19.5) | CSEM25 (2.5) | BX-AA (1) | DDM (1.26) |

After the preparation of the polymers, product emulsions are analyzed to determine the pH, percent total solids (TS) based on polymer content, and Brookfield viscosity (spindle #2, 20 rpm, ambient room temperature). Additionally, the glass transition temperature (Tg) of selected product polymers are determined by Method C above. The product polymer emulsions, as produced, generally have a pH of not more than about 5.5, typically in the range of about pH 2.5-4.5; total solids (TS) in the range of about 15 to about 45 weight percent; a Brookfield viscosity in the range of about 10 to not more than about 100 mPa·s, and a Tg in the range of about 35° C. to about 150° C. The pH of the polymer emulsions can be adjusted with acidic agents or alkaline agents to a pH preferably in the range of about 3 to 7.5, or until the composition is substantially clear or translucent, as desired. Where clarity is not a problem or where alkaline pH is desired, the pH of the composition can be adjusted to an alkaline pH of even greater than 12 and remain alkali stable as illustrated in the following examples.

EXAMPLES 2-8

Aqueous Gels

The aqueous gels were prepared by diluting the product polymer emulsion with water to obtain the desired active polymer concentration and then neutralizing the diluted polymer emulsion with 2-amino-2-methyl-1-propanol (AMP, 95%) to a pH of about 5.8 to about 7.5, or until the composition was substantially clear. The % clarity value was obtained by Method B, the viscosity was measured by Method A. The results obtained are set forth in Table 3.

These examples illustrate the rheology modification and clarity achieved in aqueous gels containing the inventive polymers. Comparative Examples 2 and 3, illustrate the viscosity, and clarity of aqueous gels containing Comparative Polymer CP-1 of Example 1, a crosslinked, hydrophobically modified alkali-swellable emulsion (HASE) polymer having one associative monomer, in the amounts shown in Table 3. Examples 4 to 8 illustrate the thickening and clarity of aqueous gels containing, respectively, one the following inventive crosslinked ASAP from Example 1, Polymer C, D, E, or F, in the amount indicated in Table 3, each employing one associative monomer (BEM25) that is the same associative monomer of Comparative Polymer CP-1, and various different associative monomers (i.e., a linear alkyl group (LEM23), complex ester (HCOEM25), or aryl-substituted alkyl group (TEM25)).

TABLE 3

| Ex. No. | Poly. No. | Wt % Poly. | pH | % Clarity | Viscosity mPa · s Immed. | Viscosity mPa · s 24 hrs. |
|---|---|---|---|---|---|---|
| 2 | CP-1 | 1 | 7.4 | 67.5 | 14,300 | 18,400 |
| 3 | CP-1 | 1.2 | 7.3 | 67.1 | 21,750 | 36,800 |
| 4 | C | 1 | 6.6 | 68.0 | 14,100 | 30,600 |
| 5 | C | 1.2 | 6.6 | 68.3 | 28,900 | 51,400 |
| 6 | D | 1.2 | 6.5 | 81.5 | 28,600 | 32,980 |
| 7 | E | 1.2 | 6.8 | 65.1 | 32,200 | 57,400 |
| 8 | F | 1.2 | 6.5 | 69.5 | 29,200 | 56,400 |

As shown in Table 3 each of the aqueous compositions containing the inventive Polymers, C-F, achieved an initial gel viscosity substantially similar to or greater than that of Comparative HASE Polymer CP-1 at corresponding active polymer concentration of about 1 and about 1.2 weight %. After 24 hours, the viscosity of all the gels of Polymers C-F was substantially greater than the gels of Comparative HASE Polymer CP-1 at the corresponding concentration. Further, the aqueous gels made with the inventive Polymers C-F achieved clarity at a lower pH (pH<7) than did Comparative Polymer CP-1 (pH>7).

For further comparison, the gels of examples 2 and 3 were repeated, except that the Comparative HASE Polymer, CP-6, was employed. At an active CP-6 polymer weight of about 1% and about pH 7.4, the 24-hour viscosity was 6,500 mPa·s and the % clarity was only about 26.2. At an active CP-6 polymer weight of about 1.2% and about pH 6.7, the 24-hour viscosity was about 17,300 mPa·s and the % clarity was only about 29.9.

EXAMPLES 9-11

Aqueous Gels

Examples 9-11 respectively illustrate the viscosity and clarity achieved in aqueous gels containing the inventive Polymers A, K and L of Example 1, each at active polymer concentrations of about 1.2 weight %, as shown in Table 4 below. Polymer A is a non-crosslinked analog of Polymer C of Example 5. Polymers K and L illustrate crosslinked polymers having different crosslinkers and varying hydrophobe content. The gels were prepared and neutralized to the pH indicated, and viscosity and % clarity determined as described in Examples 2-8.

TABLE 4

| Ex. No. | Poly. No. | Wt % Poly. | pH | % Clarity | Viscosity mPa · s Immed. | Viscosity mPa · s 24 hrs |
|---|---|---|---|---|---|---|
| 9 | A | 1.2 | 6.8 | 79.9 | 49,980 | 116,200 |
| 10 | K | 1.2 | 6.6 | 77.7 | 30,500 | 62,600 |
| 11 | L | 1.2 | 7.2 | 80.1 | 39,800 | 86,800 |

As shown in Table 4, the gel made with the inventive non-crosslinked Polymer A (Ex. No. 9) had better clarity and higher viscosity than the gel containing non-crosslinked Polymer C of Example 5. The aqueous gels made with Polymers K and L (Ex. Nos. 10 and 11) also demonstrate good thickening and clarity.

EXAMPLES 12-13

Aqueous Gels

Examples 12-13 illustrate the viscosity and clarity achieved in aqueous gels containing the inventive ASAP of Example 1, Polymer N (Ex. 12A, 12B) and Polymer O (Ex. 13A, 13B), at the various active weight % indicated in Table 5. Polymer O has three different associative monomers, two of which have linear alkyl hydrophobic end groups, and one of which has a carbocyclic alkyl hydrophobic end group; whereas Polymer N has two associative monomers, one having a linear alkyl hydrophobic end group, and the other a carbocyclic alkyl hydrophobic end group. The aqueous gels were prepared and neutralized to the pH indicated, and viscosity and % clarity determined as described in Examples 2-8.

TABLE 5

| Ex. No. | Poly. No. | Wt % Polymer | pH | % Clarity | Viscosity mPa · s Immed. | Viscosity mPa · s 24 hrs. |
|---|---|---|---|---|---|---|
| 12A | N | 1.5 | 6.5 | 79.9 | 23,450 | 32,400 |
| 12B | N | 2 | 6.3 | 79.2 | 34,350 | 51,600 |
| 13A | O | 1.5 | 6.6 | 54 | 66,800 | 85,800 |
| 13B | O | 2 | 6.5 | 52.2 | 122,800 | 164,800 |

Table 5 shows that, at the same active polymer concentration, the inventive Polymer O provided gels with greater viscosities than Polymer N.

EXAMPLES 14-15

Aqueous Gels

Examples 14-15 illustrate the viscosity and % clarity in aqueous hair setting compositions containing 1.2 or 1.5 active weight % of ASAP, Polymer AB (Ex. 14A, 14B) or Polymer AM (Ex. 15A, 15B) of Example 1. Polymers AB and AM each have three different associative monomers, two of which have linear alkyl hydrophobic end groups and one of which has a carbocyclic alkyl hydrophobic end group. The polymers have the same type of semihydrophobic monomers and different types of crosslinking monomers.

The compositions were prepared employing the formulation shown in Table 6.

TABLE 6

| Ingredient | Wt % |
| --- | --- |
| Polymer, as indicated below | 1-1.5 |
| Propylene glycol | 0.5 |
| Metal ion Chelating Agent | 0.1 |
| Preservative | 0.5 |
| AMP to pH indicated below | q.s. |
| Deionized Water to 100% | q.s. |

The viscosity was measured by Method A, and the % clarity was obtained by Method B as shown below in Table 7.

TABLE 7

| | Polymer AB | | Polymer AM | |
| --- | --- | --- | --- | --- |
| | Ex. 14A | Ex. 14B | Ex. 15A | Ex. 15B |
| Polymer % (active) | 1.2 | 1.5 | 1.2 | 1.5 |
| pH | 6.5 | 6.5 | 6.7 | 6.7 |
| % Clarity | 77.2 | 76.3 | 83.8 | 81.2 |
| Viscosity (mPa · s) | | | | |
| Immediate | 4,740 | 13,460 | 21,150 | 39,550 |
| 24 hour | 7,400 | 16,650 | 30,800 | 39,800 |

Polymer AM provided a greater viscosity than Polymer AB. Both polymers provided products having very good clarity.

EXAMPLES 16-28

Aqueous Gels

Examples 16-28 illustrate the clarity and viscosity achieved in aqueous gels containing the following ASAP of Example 1, crosslinked Polymers E (Exs. 16 A, B), F (Exs. 17A, B), H (Exs. 19A-C), J (Exs. 21A, B), K (Exs. 22 A, B), L (Ex. 23A, B), M (Ex. 24 A-C) AT (Exs. 25 A-D), AU (Exs. 26 A-C), AV (Exs. 27A, B), AW (28 A, B) and non-crosslinked Polymers G (Exs. 18 A-C) and I (Exs. 20 A, B) at various active weight % concentrations as indicated in Table 8 below. Crosslinked Polymers H and J and non-crosslinked Polymers G and I contain chain transfer agents. Polymer M contains two crosslinking agents, one of which is ethoxylated. Polymers AT, AU, AV, and AW contain semihydrophobic monomer. The aqueous gels were prepared and neutralized to the pH indicated, and viscosity and % clarity determined as described in Examples 2-8. The results are shown in Table 8.

TABLE 8

| Ex. No. | Poly. No. | Wt % polymer | pH | % Clarity | Viscosity mPa · s Immed. | Viscosity mPa · s 24 hr |
| --- | --- | --- | --- | --- | --- | --- |
| 16A | E | 1.5 | 6.8 | 65 | 73,200 | 109,800 |
| 16B | E | 1.8 | 6.8 | 64.7 | 120,800 | 144,600 |
| 17A | F | 1.5 | 6.5 | 69.2 | 49,800 | 94,800 |
| 17B | F | 1.8 | 6.4 | 68.7 | 73,400 | 117,600 |
| 18A | G | 1.5 | 6.4 | 92.1 | 27,550 | 34,000 |
| 18B | G | 1.8 | 6.3 | 91.8 | 27,350 | 36,200 |
| 18C | G | 2 | 6.3 | 91 | 45,650 | 66,800 |
| 19A | H | 1.5 | 6.3 | 95.9 | 30,950 | 37,200 |
| 19B | H | 1.8 | 6.3 | 94.2 | 46,450 | 57,800 |
| 19C | H | 2 | 6.4 | 94 | 79,800 | 86,600 |
| 20A | I | 1 | 6.4 | 96.5 | 23,800 | 35,050 |
| 20B | I | 1.2 | 6.2 | 95 | 42,600 | 79,200 |
| 21A | J | 1 | 6.2 | 94.6 | 19,600 | 25,850 |
| 21B | J | 1.2 | 6.1 | 97 | 35,900 | 68,200 |
| 22A | K | 1.5 | 6.6 | 75.2 | 65,200 | 96,200 |
| 22B | K | 1.8 | 6.6 | 70.3 | 103,200 | 136,200 |
| 23A | L | 1.5 | 7 | 83.3 | 58,200 | 97,200 |
| 23B | L | 1.8 | 7.1 | 79.9 | 136,600 | 164,800 |
| 24A | M | 1.5 | 6.6 | 60.3 | 39,600 | 56,200 |
| 24B | M | 1.8 | 6.6 | 55.9 | 49,400 | 84,600 |
| 24C | M | 2 | 6.7 | 48.7 | 93,600 | 119,400 |
| 25A | AT | 1 | 6.5 | 86.2 | 9,700 | 11,200 |
| 25B | AT | 1.2 | 6.5 | 84.3 | 13,850 | 14,000 |
| 25C | AT | 1.5 | 6.5 | 82.5 | 36,200 | 44,400 |
| 25D | AT | 2 | 6.5 | 85.8 | 71,600 | 78,200 |
| 26A | AU | 1 | 6.3 | 89.1 | 6,720 | 7,850 |
| 26B | AU | 1.2 | 6.3 | 87.2 | 8,100 | 9,300 |
| 26C | AU | 1.5 | 6.2 | 86.6 | 12,400 | 13,050 |
| 27A | AV | 1.5 | 6.5 | 92.3 | — | 23,200 |
| 27B | AV | 2 | 6.5 | 93.6 | — | 50,000 |
| 28A | AW | 1.5 | 6.5 | 86.2 | — | 18,500 |
| 28B | AW | 2 | 6.5 | 87.6 | — | 32,700 |

The viscosities of all the aqueous gels containing Polymers E-M (Exs. 16-24) underwent a substantial increase as these aqueous compositions aged over 24 hours or so. Polymers G, H, I, J and K demonstrated a surprisingly enhanced clarity and viscosity, greater than even that of Polymers E, F, L and M at similar concentration.

Surprisingly, the viscosity of Polymers AT-AU was substantially unchanged over 24 hours or so. Polymers AT-AW were judged suitable for either high viscosity or gel compositions.

EXAMPLE 29

Aqueous Gels

This example demonstrates that ASAP can be combined with hydrophobically-modified carbomer polymer to provide gels (i.e., having a Brookfield viscosity above 10,000 mPa·s) over a broad pH range of about 5.3 to about 13.3.

Nine aqueous gels (Exs. 29A-I) were separately prepared, each containing, on a final weight basis, about 0.8 active weight % ASAP, Polymer AT of Ex. 1, and about 0.4 active weight % hydrophobically-modified carbomer polymer, CARBOPOL® Ultrez 21 polymer, (Noveon, Inc., Cleveland, Ohio), and each gel respectively having sufficient neutralizing base (sodium hydroxide, 18%) to obtain a pH of 5.3 (Ex. 29A), 7 (Ex. 29B), 8 (Ex. 29C), 9.1 (Ex. 29D), 10 (Ex. 29E), 11.5 (Ex. 29F), 12.3 (Ex. 29G), 13.1 (Ex. 29H), and 13.3 (Ex. 29I). The viscosity of each gel was determined as described in Method A. Surprisingly, as shown by the following results, gels were obtained at all pH values: Brookfield viscosity in mPa·s was 49,800 (Ex. 29A); 86,400 (Ex. 29B); 75,800 (Ex. 29C); 69,400 (Ex. 29D); 65,500 (Ex. 29E); 63,700 (Ex. 29F); 57,600 (Ex. 29G); 32,100 (Ex.

29H); and 24,800 (Ex. 29I). Also demonstrated was that the two anionic polymers were compatible over the entire pH range examined.

EXAMPLE 30

Aqueous Gels

Electrolytes are generally known to reduce the viscosity obtained with conventional carbomer polymer thickeners. This example demonstrates that generally unexpectedly high viscosity surprisingly can be achieved with ASAP, Polymer AT of Example 1, in the presence of an electrolyte (e.g., sodium chloride), in combination with a hydrophobically modified carbomer polymer, CARBOPOL® Ultrez 21 polymer, (Noveon, Inc., Cleveland, Ohio).

Gel Series A. An aqueous gel was prepared containing, on a total weight basis, about 1.25 weight % Polymer AT of Example 1, neutralized with AMP to about pH 6.4-6.8. The gel had a Brookfield viscosity of about 22,400 mPa·s. The procedure was repeated to provide three separate aqueous gels, except that each gel also contained, respectively, the following weight % of sodium chloride, 0.1, 0.25, and 0.5. The salt decreased the Brookfield viscosity of the ASAP gel to about 8,100 mPa·s (0.1% salt), to about 3,200 mPa·s (0.25% salt) and to about 900 mPa·s (0.5% salt).

Gel Series B. The procedure of Series A was repeated, except that the aqueous gels contained, on a total weight basis, about 1.25 active weight % CARBOPOL® Ultrez 21 polymer. The Brookfield viscosity of the salt free gel was about 98,200 mPa·s, which was decreased by the salt to about 61,800 mPa·s (0.1% salt), to about 44,600 mPa·s (0.25% salt), and to about 28,400 mPa·s (0.5% salt).

Gel Series C. The procedure of Series A was repeated, except that the aqueous gels contained, on a total weight basis, a total polymer weight of about 1.25 weight % comprised of about 0.75 active weight % Polymer AT and about 0.5 active weight % CARBOPOL® Ultrez 21 polymer. The Brookfield viscosity of the salt free gel was about 105,000 mPa·s. The Brookfield viscosity in the presence of salt remained unexpectedly high at about 71,200 mPa·s (0.1% salt), about 55,800 mPa·s (0.25% salt), and about 42,050 mPa·s (0.5% salt).

The data surprisingly show that a combination of the ASAP and hydrophobically modified carbomer polymer provided gels having a generally unexpectedly higher viscosity in the presence of electrolyte, as well as a generally higher salt tolerance than that of gels containing the individual polymer.

EXAMPLE 31

Sunscreen Lotions and Creams

This example illustrates the compatible use, on a total composition weight basis, of a combination of ASAP, Polymer AT of Example 1, at either about 0.5 active weight % (Ex. 31A) or about 1 active weight % (Ex. 31B) with about 0.15 active weight % carbomer polymer, CARBOPOL® 980 polymer, (Noveon, Inc., Cleveland, Ohio), in a water-resistant type sunscreen formulation having a high SPF (Sun Protective Factor) value of greater than about 30.

In addition to the foregoing polymers, the sunscreen formulations of Ex. 31A and 31B each also contained, on a total composition weight basis, about 2 active weight % hexylene glycol, about 7.5 active weight % octyl methoxycinnamate, about 6 active weight % benzophenone-3, about 5 active weight % octyl salicylate, about 10 active weight % octylcrylene, about 2 active weight % PEG-20 stearate (INCI name for CERASYNT 840, ISP Van Dyk & Co., Belleville N.J.), about 5 weight % glyceryl stearate(and) laureth-23 (INCI name for CERASYNT 945, ISP Van Dyk & Co., Belleville N.J.), preservative (q.s.), deionized water (q.s. to 100 weight %) and sufficient base (triethanolamine, 99%) to obtain a pH in the range of about 6.5-6.6.

The Brookfield viscosity for Ex. 31A was about 19,400 mPa·s and for Ex. 31B was about 40,800 mPa·s. The viscosity remained substantially unchanged over a storage period of about two months at a temperature of about 45° C. The sunscreen of Ex. 31 A was an aesthetically smooth, glossy lotion and that of Ex. 31B was an aesthetically smooth, glossy cream. Both sunscreens were judged as having excellent spreadability, and rich, firm, textural, sensory product attributes.

EXAMPLES 32-35

Skin Care Lotion

Examples 32-35 illustrate the stabilization of a skin care lotion formulation containing, on a total composition basis, about 0.25 active weight % of the humectant salt, sodium PCA (INCI name for the sodium salt of DL-pyrrolidone carboxylic acid, sold under the trade name AJIDEW® N-50, by Ajinomoto Inc., Teaneck, N.J.), employing relatively low concentrations of ASAP, Polymer AT of Example 1, alone or in combination with hydrophobically-modified carbomer polymer, CARBOPOL® Ultrez 21 polymer, (Noveon, Inc., Cleveland, Ohio), while achieving high viscosity.

Five skin care lotions were separately prepared containing as the stabilizer, the following amounts, on a total composition weight basis: about 0.6 active weight % Polymer AT (Ex. 32A), about 1 active weight % Polymer AT (Ex. 32B); about 0.3 active weight % Polymer AT and about 0.3 active weight % CARBOPOL® Ultrez 21 polymer (Ex. 33); about 0.6 weight % Polymer AT and about 0.3 active weight % CARBOPOL® Ultrez 21 polymer (Ex. 34); and about 0.6 active weight % of the carbomer polymer (Ex. 35).

Each of the skin care lotions contained, in addition to the foregoing sodium PCA and polymer indicated, on a total composition weight basis, about 2 active weight % glycerin, about 3 active weight % sunflower seed oil, about 5 active weight % caprylic/capric triglycerides, about 4 active weight % cetearyl octanoate, about 3 active weight % cocoa butter, preservative (q.s.), fragrance (q.s.), and sufficient AMP (95%) to obtain about pH 6.4-6.5.

The lotions of Exs. 32A, 32B, and 35 were prepared by generally recognized emulsion technique by combining the water insoluble components together to provide an oil phase, combining the glycerin, water, and polymer to provide a water phase, adding the oil phase to the water phase, then adding the preservative and fragrance, and adjusting the pH, as needed. The lotions of Exs. 33 and 34 were similarly prepared, except that the polymers were blended by pre-dispersing the CARBOPOL® Ultrez 21 polymer in a portion of the water, then adding the Polymer AT was added to the dispersion, neutralizing the resulting polymer blend, and then incorporating the resulting polymer blend into the water phase.

All of the skin care lotions containing ASAP (Exs. 32A, 32B, 33 and 34) produced products having a Brookfield viscosity greater than 10,000 mPa·s and remained physically stable, even after storage for a period of at least two months at ambient room temperature and at elevated temperature (45° C.), with no loss in viscosity. In contrast, the lotion of Ex. 35 containing no ASAP was not stabilized (separated into two phases substantially immediately). All of the stabilized lotions of Exs. 32-34 were judged aesthetically smooth, and easy to spread. The sensory tactile properties of the lotion of Ex. 34 were further enhanced by repeating the preparation of the lotion and further including about 0.6 active weight % of dimethicone PEG-7 isostearate (INCI name for a water-dispersible dimethicone copolyol ester sold under the trade name, ULTRASIL™ DW-18 silicone, by Noveon, Inc., Cleveland Ohio) without loss in stability, or viscosity under the foregoing storage temperatures and periods.

EXAMPLE 36

Alkali-Soluble Associative Polymers

Alkali-soluble ASAP of the present invention, exemplified by Polymers BA through BL of Ex. 1, Table 2D, are judged useful in a variety of applications as foam enhancers, and as film formers in products where relatively low thin viscosity is desired.

Aqueous solutions of Polymers BE, BF, BG, BI, BJ and BK, each of which contains one associative monomer, were prepared at active polymer weight concentrations of about 3, 5, and 10%, and were neutralized to a pH in the range of about 6.5 to about 7.5 with AMP (95%). At a polymer concentration of about 3% by weight, the Brookfield viscosities of the solutions were too low to measure. At about 5% by weight, each of the polymers afforded a solution having a Brookfield viscosity of not more than about 25 mPa·s. Even at about 10% concentration, the polymers all afforded aqueous solutions with Brookfield viscosities of not more than about 300 mPa·s.

The foregoing procedure was repeated, except that the aqueous solutions contained Polymer BA, which has two associative monomers. The Brookfield viscosity, at a Polymer BA concentration of about 3% was less than about 15 mPa·s, of about 5%, was about 61 mPa·s, and of about 10% was about 850 mPa·s.

In contrast, a 5% solution of a polymer similar to Polymers BI and BJ, but lacking the semihydrophobic monomer (i.e., a polymer comprising 48.2% EA, 19.5% MMA, 29% MAA, 2.5% BEM25, and 0.8% DDM) had a Brookfield viscosity of greater than about 3,000 mPa·s and an undesirable stringy texture. Similarly, a 5% solution of another similar polymer having neither a semihydrophobic monomer nor a chain transfer agent (i.e., a polymer comprising 49% EA, 19.5% MMA, 29% MAA and 2.5% BEM25) had a Brookfield viscosity of greater than about 300,000 mPa·s and an undesirable lumpy texture.

The alkali-soluble associative polymers of the present invention are judged as excellent foam enhancers for aqueous and hydro-alcoholic pump and spray foam products, such as shaving creams, foaming hair fixatives, foam-type cleansing agents, and the like. The polymers are compatible and soluble in aqueous alcohol solutions containing up to at least about 55% by volume ethanol, at polymer concentrations of at least about 5% by weight making them suitable for low VOC (not more than about 55% volatile organic compounds) compositions.

The alkali-soluble associative polymers of the present invention are also compatible with hydrocarbons, making the polymers useful in high VOC pressurized or non-pressurized aerosol spray applications (up to at least about 85% VOC) as well. For example, in a solution of about 20% by volume cyclohexane in ethanol (95%) the solubility of Polymer BJ of Ex. 1 was about 5 active weight % at room temperature and about 2 active weight % at a temperature of about 4° C. In a solution of 50% by volume cyclohexane in ethanol (95%), Polymer BJ was soluble at a concentration of about 1 active weight % at both room temperature and at about 4° C. The solutions remained clear and transparent (i.e., no cloudiness was observed).

Polymers BG and BI were each separately formulated in 55% aqueous ethanol at a level of about 5 active weight % polymer and neutralized with AMP (95%) to a pH in the range of about 7 to about 8. Each ASAP provided a solution having a Brookfield viscosity of about 5 mPa·s. Polymer BG provided a fine mist spray when pumped from a manually actuated pump sprayer. Polymer BI afforded a rich, thick, glossy foam when dispensed from a mechanical, non-pressurized aerosol foam dispenser (e.g., mechanical foam dispensers available from Airspray International, Inc., Pompano Beach, Fla.). Both formulations provided excellent high humidity resistance, based on Method F when applied to hair, did not leave a flaky residue on the hair and washed out easily.

The alkali-soluble ASAP are judged suitable for use in hydrocarbon-based (e.g., n-butane, pentane, and isobutane) pressurized aerosol formulations and for non-pressurized aerosol formulations where no chemical or gaseous propellants are used.

EXAMPLE 37

Humidity Resistance

The humidity resistance of the hair tresses treated by the inventive polymers was assessed by the procedure of Method F, based on an HHCR of a minimum of 70% Curl Retention on hair. The aqueous gel compositions containing Polymers C, D, E and F of Examples 4-8 and 16-19, Polymers A, K and L of Examples 9-11, Polymers N and O of Examples 12-13, Polymers G-M and AT-AW of Examples 18-28 were evaluated. Surprisingly, all of the inventive polymers demonstrated very good to excellent high humidity resistance, i.e., an HHCR of at least 70% or more curl retention for a minimum of about four hours. The subjective curl memory (bouncy/restylability) properties of the curled hair assessed by Method G above were also judged good to excellent after exposure to 90% RH over 24 hours indicating that the inventive associative polymers were suitable for use in hair care applications for hair setting and styling.

EXAMPLES 38-40

Aqueous Formulations

The procedure of Examples 14-15 was followed except that the inventive ASAP of Example 1, Polymers P (Ex 38A, 38B, 38C), Q (Ex. 39A, 39B, 39C), and R (Ex. 40A, 40B, 40C) were employed in the amounts shown in Table 7. Each of Polymers P, Q, and R has the same type of associative monomer and crosslinker; and Polymers Q and R also contain different semihydrophobic monomers.

Additionally, the gel texture was assessed by spreading a portion of the gel or viscous formulation over a MYLAR® film substrate employing a 10 mil opening draw down applicator and observing its smoothness and spreadability characteristic. When the texture of the gel coating was smooth and spreadable, it was rated as "S"; when the gel coating appeared grainy, it was rated as "G". The results are shown in Table 9 below.

TABLE 9

| Ex. No. | Poly. No. | Wt % Poly. | pH | % Clarity | Visc. mPa·s Immed. | Visc. mPa·s 24 hrs. | Gel Texture |
|---|---|---|---|---|---|---|---|
| 38A | P | 1 | 6.8 | 88.2 | 13,500 | 14,800 | S |
| 38B | P | 1.2 | 6.8 | 84.6 | 24,500 | 26,750 | S |
| 38C | P | 1.5 | 6.8 | 81.7 | 39,750 | 42,500 | G |
| 39A | Q | 1 | 6.8 | 71.8 | 8,800 | 9,200 | S |
| 39B | Q | 1.2 | 6.8 | 63.6 | 13,750 | 13,500 | S |
| 39C | Q | 1.5 | 6.9 | 65 | 26,250 | 27,000 | S |
| 40A | R | 1 | 6.9 | 94.9 | 9,500 | 10,000 | S |
| 40B | R | 1.2 | 6.9 | 92.8 | 19,500 | 19,500 | S |
| 40C | R | 1.5 | 6.8 | 93.8 | 27,250 | 29,000 | S |

As shown in Table 9, all the polymers produced "S" gel textures, except for the crosslinked Polymer P at a concentration of 1.5% (Ex. 38C). The texture of the gels obtained with Polymers Q and R were judged to be soft, smooth, and spreadable, even as the concentration of the polymer increased, compared to the texture of the gels obtained with Polymer P, containing no semihydrophobic monomer. Additionally, Polymers Q and R produced gels having a viscosity that remained substantially unchanged over a 24-hour period.

Surprisingly, at all concentrations, Polymers P, Q and R demonstrated good to excellent high humidity resistance, based on an HHCR of greater than 70% curl retention by Method F over a period of about four hours exposure.

EXAMPLE 41-44

Aqueous Formulations

In Examples 41-44, the procedure of Examples 38-40 was followed except that the inventive ASAP of Example 1, Polymers AF (Ex. 41A, B), AG (Ex. 42A, B), AH (Ex. 43A, B), and AI (Ex. 44A, B), were employed at the amounts shown in Table 10. The polymers have varying amounts of the same type of semihydrophobic monomer.

The aqueous gels were prepared and neutralized to the pH indicated in Table 10 below as described in Examples 2-8. The texture of the gels was evaluated as described in Examples 38-40. The results are in Table 10.

TABLE 10

| Ex. No. | Poly. No. | Wt % Poly. | pH | % Clarity | Visc. mPa·s Immed. | Visc. mPa·s 24 hrs. | Gel Texture |
|---|---|---|---|---|---|---|---|
| 41A | AF | 1 | 7 | 83.6 | 18,600 | 26,650 | S |
| 41B | AF | 1.2 | 6.9 | 82.9 | 23,650 | 34,900 | S |
| 42A | AG | 1 | 6.9 | 67 | 13,550 | 18,350 | S |
| 42B | AG | 1.2 | 6.9 | 65.8 | 21,050 | 32,400 | S |
| 43A | AH | 1 | 7 | 85.5 | 16,700 | 25,450 | S |
| 43B | AH | 1.2 | 6.9 | 86.4 | 22,950 | 36,400 | S |
| 44A | AI | 1 | 6.7 | 93.6 | 16,550 | 23,500 | S |
| 44B | AI | 1.2 | 6.6 | 92.8 | 21,700 | 28,800 | S |

The data show that at all concentrations, the texture of the gel produced was smooth and spreadable ("S"). Each of the polymer gels was also found to have excellent high humidity resistance, based on an HHCR of greater than 70% curl retention by Method F over a period of more than four hours exposure. Surprisingly, varying the amount of semihydrophobic monomer from about 2.5 weight % (Polymer AF) up to about 15 weight % (Polymer AI) had no adverse effect on the viscosity of the gels at each concentration.

EXAMPLES 45-50

Aqueous Gels

The procedure of Examples 14-15 was followed, except that the ASAP of Example 1, Polymer X (Ex. 45A, 45B, 45C), Polymer Y (Ex. 46A, 46B, 46C), Polymer Z (Ex. 47A, 47B, 47C), Polymer AO (Ex. 48A, 48B), Polymer AP (Ex. 49A, 49B), and Polymer AQ (Ex. 50A, 50B), were employed in the amounts shown in Table 11. Each polymer contains; a semihydrophobic monomer component and two associative monomer components; and Polymers AO and AP each also have two nonionic vinyl monomer components.

The % clarity and viscosity at various active weight % polymer as indicated are shown in Table 11.

TABLE 11

| Ex. No. | Poly. No. | Wt % Poly. | pH | % Clarity | Visc. mPa·s Immed. | Visc. mPa·s 24 hrs. |
|---|---|---|---|---|---|---|
| 45A | X | 1 | 6.9 | 90.4 | 11,600 | 12,800 |
| 45B | X | 1.2 | 6.9 | 90.9 | 20,000 | 20,500 |
| 45C | X | 1.5 | 6.8 | 88.1 | 38,750 | 38,250 |
| 46A | Y | 1 | 6.8 | 81.4 | 12,800 | 14,100 |
| 46B | Y | 1.2 | 6.9 | 83.3 | 24,750 | 28,500 |
| 46C | Y | 1.5 | 6.8 | 86.3 | 59,000 | 63,000 |
| 47A | Z | 1 | 6.8 | 79 | 7,700 | 7,760 |
| 47B | Z | 1.2 | 6.9 | 78.5 | 15,500 | 14,960 |
| 47C | Z | 1.5 | 6.8 | 78 | 27,500 | 31,350 |
| 48A | AO | 1 | 6.4 | 80.2 | 8,230 | 11,650 |
| 48B | AO | 1.5 | 6.8 | 81.7 | 22,790 | 37,850 |
| 49A | AP | 1 | 6.9 | 89.2 | 9,780 | 14,890 |
| 49B | AP | 1.5 | 6.9 | 88.7 | 20,960 | 38,970 |
| 50A | AQ | 1 | 7 | 78.1 | 9,440 | 13,990 |
| 50B | AQ | 1.5 | 7.2 | 78 | 27,940 | 47,700 |

The data show that each of the Polymers demonstrated good clarity and viscosity. The high humidity resistance of each of the polymers was also judged excellent, based on 70% curl retention for more than four hours exposure.

EXAMPLE 51

Aqueous Silicone Gels

This example illustrates aqueous silicone-containing gels prepared employing ASAP of Example 1, Polymer K (Ex. 51A) and Polymer M (Ex. 51B), in the amounts and composition shown in Table 12.

TABLE 12

| Ingredients | Ex. 51A Weight % | Ex. 51B Weight % |
|---|---|---|
| Polymer | 1 | 1.5 |
| AMP (95%) | To pH 7.4 | To pH 6.4 |
| Dimethicone PEG-7 phthalate (Note 1) | 1.5 | 1 |
| Preservative | q.s | q.s |
| Fragrance | q.s. | q.s. |
| Deionized water to 100% | q.s. | q.s. |
| Viscosity (24 hrs.) | 33,000 | 39,200 | q.s. = Quantity sufficient to meet the requirement
Note 1.
INCI name for a water-soluble, anionic silicone carboxy compound sold under the trade name ULTRASIL ™ CA-1, by Noveon, Inc.

EXAMPLES 52

Hydro-Alcoholic Spray

Example 52 illustrates the use of about 1.5 (Ex. 52A) and about 2 (Ex. 52B) active weight % of Polymer M of Example 1 in a spray composition having a low volatile organic compounds (VOC) content employing a hydro-alcoholic solvent system comprising 55% ethanol and water, neutralizing amine (AMP), preservative and fragrance as shown in Table 13.

TABLE 13

| Ingredients | Ex. 52A Weight % | Ex. 52B Weight % |
|---|---|---|
| Polymer M | 1.5 | 2 |
| Ethanol, SD 40 | 55 | 55 |
| AMP (95%) | To pH 6.9 | To pH 6.7 |
| Preservative | q.s. | q.s. |
| Deionized water to 100% | q.s. | q.s. |
| Fragrance | q.s. | q.s. |

The formulations showed a good, substantially uniform spray pattern when dispensed from a manually actuated pump spray and were suitable for use in low VOC sprays, such as those desired for hair care applications.

EXAMPLE 53

Facial Scrub

Example 53 illustrates the clarity, thickening and suspension efficacy of inventive Polymer A of Example 1 (Ex. 53A) and a non-crosslinked Comparative HASE Polymer, CP-2 (Ex. 53B), in the following high surfactant, low pH formulation shown in Table 14 at an active polymer weight of about 1.5% suitable as a facial scrub.

TABLE 14

| Ingredients (INCI/Trade Name) | Wt. % |
|---|---|
| 1. Polymer as indicated below in Table 15 | 1.5 |
| 2. Sodium $C_{14}$-$C_{16}$ Olefin sulfonate (40%) (Note 2) | 45 |
| 3. NaOH (18%) To pH 6.5 | q.s. |
| 4. Glycerin | 2 |
| 5. Salicylic acid (USP) | 2 |
| 6. Jojoba esters (Note 3) | 2 |
| 7. Cocamidopropyl betaine (35%) | 10 |
| 8. Fragrance | q.s. |
| 9. FD&C Red 33 (0.1%) | 0.1 |
| 10. D&C Yellow # 6 (0.1%) | 0.2 |
| 11. Citric acid (50%) To pH 5.2-5.4 | q.s. |
| 12. Deionized water To 100% | q.s. |

Note 2.
Alpha olefin sulfonate, such as BIO-TERGE ® AS-40, Stepan Company.
Note 3.
INCI name for microspheres of jojoba esters, such as FLORABEADS ® sold by International Flora Technologies, Ltd.

The composition was prepared by pre-gelling ingredient #1 by dispersing it in a portion of the water (#12), admixing therein a portion of the primary surfactant, ingredient #2, with mild stirring to avoid aeration, and neutralizing the polymer admixture with ingredient #3 to about pH 6.5 and then adjusting the pH of the resulting gel to about pH 5.2-5.4 with ingredient #11 to provide a gel phase. Separately, ingredients #4, 5 and the remaining portions of the water (#12) and primary surfactant (#2) were admixed to dissolve and the resulting solution was added slowly with mild mixing agitation to the gel phase. The secondary surfactant, ingredient #7, and remaining ingredients (#6, 8, 9 and 10) were then added, taking care to avoid aerating agitation. The turbidity was determined before adding the product colorants. The final pH and viscosity was measured after 24 hours aging at ambient room temperature (about 25° C.). The results are shown in Table 15.

TABLE 15

| | Ex. 53A (Polymer A) | Ex. 53B (Comparative Polymer CP-2) |
|---|---|---|
| Final pH | 4 | 4 |
| Viscosity (#6 @ 20 rpm), mPa · s | 14,600 | 11,500 |
| Turbidity NTU (Before color) | 41.5 | 128 |

The composition containing Polymer A (Ex. 53A) had good clarity whereas the composition containing Comparative Polymer CP-2 (Ex. 53B) was turbid. Suspension of the jojoba beads was visually assessed after 12 weeks accelerated storage aging in an oven at about 45° C. Both polymers maintained a stable suspension of the jojoba ester beads during accelerated aging.

EXAMPLE 54

Surfactant Cleansers

This example illustrates the clarity, viscosity and suspending properties of ASAP of Example 1, Polymer M (Ex. 54A), Polymer U (Ex. 54B), Polymer AK (Ex. 54C), and Polymer D (Ex. 54D) and that of comparative polymer, CP-6, of Example 1 (Ex. 54E), each at an active polymer concentration of about 2 weight % employing the formulation provided in Table 16, suitable for use as a body wash, skin cleanser or shampoo.

TABLE 16

| Ingredients (INCI/Trade Name) | Wt % |
|---|---|
| 1. Polymer, as indicated below in Table 17 | 2 |
| 2. Sodium laureth sulfate (28%) (Note 4) | 30 |
| 3. NaOH (18%) to pH indicated | q.s. |
| 4. Propylene glycol | 2 |
| 5. Cocamidopropyl betaine (35%) | 4 |
| 6. EDTA, Disodium | 0.1 |
| 7. Preservative | q.s. |
| 8. U.V. Absorber | q.s. |
| 9. Fragrance solubilized in Polysorbate-20 | q.s. |
| 10. FD&C Blue #1 (0.1%) | 0.05 |
| 11. D&C Yellow #10 (0.1%) | 1.5 |
| 12. Vitamin E (and) Gelatin beads (Note 5) | 1 |
| 13. Deionized water To 100% | q.s. |

Note 4.
Ethoxylated with 3 moles ethylene oxide, such as STANDAPOL ® ES-3, Cognis Corporation.
Note 5.
INCI name for product sold under the trademark, LIPOPEARLS ®, Lipo Chemicals, Inc.

The compositions were prepared by pre-gelling ingredient #1 by dispersing it in a portion of the water (#13), admixing the primary surfactant, ingredient #2, therein with gentle stirring agitation to avoid foaming, neutralizing the polymer mixture to about pH 6.7 with ingredient #3, and adding ingredient #4 to the neutralized polymer mixture to provide a gel phase. Separately, ingredients #6 and 8 were premixed with the remaining portion of the water (#13), heating to dissolve and then adding the resultant solution to the gel phase. The secondary surfactant, ingredient #5, was then added to the resulting mixture with gentle stirring agitation, followed by addition of the remaining ingredients, #9, 7, 12, 10 and 11 and the final pH adjusted with ingredient #3, if necessary.

The % clarity was evaluated by Method B before adding the product colorants. After 24 hours and after accelerated aging of the products in an oven at about 45° C. for up to about 12 weeks, the pH and viscosity were again determined. The results are shown in Table 17.

TABLE 17

|  | Ex. 54A Polymer M | Ex. 54B Polymer U | Ex. 54C Polymer AK | Ex. 54D Polymer D | Ex. 54E Polymer CP-6 |
|---|---|---|---|---|---|
| pH | 6.7 | 6.6 | 6.6 | 6.6 | 6.5 |
| Visc. (#4@20 rpm), mPa · s | 1,660 | 1,800 | 7,300 | 8,400 | 456 |
| % Clarity (Before color) | 86.4 | 85.7 | — | — | 25.2 |
| Storage Stability @ 45° C. | 12 Weeks | 12 Weeks | 10 Weeks | 8 Weeks | — |
| pH | 6.51 | 6.5 | — | — | — |
| Visc. (#4@20 rpm), mPa · s | 2,900 | 3,330 | 10,280 | 7,000 | — |

The suspension of the water-insoluble beads (ingredient #12) was visually assessed. Initially only a few beads settled during the formation of the composition or over a 24-hour period. During accelerated aging storage at about 45° C., the beads remained substantially suspended (slight settling) for a period of about 12 weeks in the compositions containing Polymer M (Ex. 54A) and Polymer U (Ex. 54B). The suspension of the beads was also judged substantially stable for a period of about eight weeks in the composition containing Polymer AK (Ex. 54C) and for a period of about four weeks in the composition containing Polymer D (Ex. 54D).

In contrast, the beads were not suspended by the Comparative Polymer CP-6 (Ex. 54E) and settled out of the composition in less than 24 hours.

EXAMPLE 55

Emulsions

This example illustrates the use of about 1% active polymer weight ASAP of Example 1, Polymer N (Ex. 55A) and Polymer M (Ex. 55B), each in oil-in-water emulsions suitable for use as hand and body lotions or creams, as shown in Table 18.

TABLE 18

| Ingredients (INCI/Trade Name) | Ex. 55A Weight % | Ex. 55B Weight % |
|---|---|---|
| Mineral oil | 8 | 8 |
| Octyl stearate | 4.5 | 4.5 |
| Lanolin | 0.5 | 0.5 |
| Cetyl alcohol | 1.5 | 1.5 |
| Glyceryl stearate | 5 | 5 |
| Dimethicone | 0.1 | 0.1 |
| Polymer | 1 | 1 |
| Deionized water to 100% | q.s. | q.s. |
| NaOH, 10% | To pH 6.1 | To pH 6.5 |
| Glycerin | — | 3 |
| Propylene glycol | 2 | 2 |
| Preservative | 0.5 | 0.5 |

TABLE 18-continued

| Ingredients (INCI/Trade Name) | Ex. 55A Weight % | Ex. 55B Weight % |
|---|---|---|
| Fragrance | q.s | q.s |
| Viscosity, mPa · s | 20,050 | 14,800 |
| Appearance at RT | glossy, white lotion | glossy, white lotion |

TABLE 18-continued

| Ingredients (INCI/Trade Name) | Ex. 55A Weight % | Ex. 55B Weight % |
|---|---|---|
| Feel on skin | Non-tacky & smooth feel | Non-tacky & smooth feel |
| Viscosity, mPa · s after Aging for 14 Weeks | | |
| Room Temperature (about 25° C.) | — | 18,200 |
| 35° C. | — | 16,400 |
| 50° C. | — | 12,600 |
| Appearance after accelerated storage | smooth | smooth |

EXAMPLE 56

Liquid Surfactant

This example illustrates the use of Polymer A of Example 1 (Ex. 56A), which contains two associative monomers, and Comparative HASE Polymer CP-2 of Example 1 (Ex. 56B), which contains one associative monomer, each at an active polymer weight of about 1.5%, employed in a liquid surfactant suitable for use as a hand dishwashing liquid having the formulation shown in Table 19.

TABLE 19

| Ingredient | Wt % |
|---|---|
| Polymer, as indicated below in Table 20 | 1.5 |
| Ammonium lauryl sulfate (30%) | 25 |
| Sodium laureth sulfate (30%) (Note 4, Table 16) | 25 |
| Sodium citrate | 0.5 |
| Sodium hydroxide (18%) to pH 6.5-7 | q.s. |
| Deionized Water to 100% | q.s. |

The composition can be prepared by adding the surfactants to an aqueous solution of the polymer with slow mixing agitation to avoid excessive foam generation, adding the sodium citrate to dissolve, and adjusting the pH with sodium hydroxide. If desired, fragrance and product colorant also can be added. The viscosity and turbidity at about pH 6.5-7 are shown in Table 20.

TABLE 20

|  | Ex. 56A Polymer A | Ex. 56B Comparative Polymer CP-2 |
| --- | --- | --- |
| Viscosity mPa · s | 16,600 | 21,000 |
| Turbidity NTU | 20.3 | 108.3 |

Polymer A (Ex. 56A) produced a substantially clear composition whereas the Comparative HASE Polymer CP-2 (Ex. 56B) produced a turbid composition.

The foregoing formulations were each further acidified with citric acid to about pH 5 to provide a lower viscosity product. The viscosity and turbidity at about pH 5 are shown in Table 21.

TABLE 21

|  | Ex. 56A-pH 5 Polymer A | Ex. 56B-pH 5 Comparative Polymer CP-2 |
| --- | --- | --- |
| Viscosity mPa · s | 5,700 | 4,200 |
| Turbidity NTU | 34.9 | 90 |

Again, Polymer A (Ex. 56A-pH 5) produced a significantly clearer product than did Comparative HASE Polymer CP-2 (Ex. 56B-pH 5).

EXAMPLE 57

Hydro-alcoholic Gels

This example illustrates the use of an active polymer weight of about 1.5% Polymer L in a hydro-alcoholic gel formulation containing camphor. The formulation shown in Table 22 had a pH of about 7.3 and a viscosity of about 5,140 mPa·s.

TABLE 22

| Ingredient | Weight % |
| --- | --- |
| Polymer L | 1.5 |
| EDTA, Disodium | 0.1 |
| Isopropyl alcohol | 10 |
| Camphor (crystals) | 0.2 |
| Polysorbate 20 | 1 |
| Triethanolamine (TEA, 99%) to pH 7.3 | q.s. |
| Preservative | 0.2 |
| FD&C Blue No. 1 (5%) to color | q.s. |
| Deionized water to 100% | q.s. |

Another series of hydro-alcoholic gel embodiments were prepared containing Polymer G, H, I, or J of Example 1 at an active polymer weight % of about 3.5-4%, about 10-30% ethanol, and relatively low total amounts (<0.2%) of hair conditioning agents (Panthenol, dimethicone copolyol), preservative, solubilized fragrance and product colorant, neutralized with TEA to a pH of about 6-6.5. These hydro-alcoholic compositions had a viscosity in the range of about 7,500 mPa·s to about 90,000 mPa·s. The specular gloss produced by these compositions was determined by Method D. At an angle of 20°, the gloss value units were in the range of about 40 to about 60 and at an angle of 60°, the gloss value units were in the range of about 85 to about 90. These compositions were judged suitable for personal care and household care applications.

EXAMPLE 58

Highly Alkaline Washing Gels

This example illustrates the use of Polymer AE and of Comparative HASE Polymer CP-3 in a highly alkaline (pH>12.5) formulation containing disinfectant, suitable for use as automatic dishwashing liquids, surface cleaners and the like, employing the formulation shown in Table 23. The results are shown in Table 24.

TABLE 23

| Ingredient | Weight % |
| --- | --- |
| Polymer, as indicated below in Table 24 | 1 |
| Deionized Water to 100% | q.s. |
| Rheology stabilizer (Note 6) | 0.1 |
| Potassium carbonate | 5 |
| Potassium silicate (39%) | 15 |
| Potassium hydroxide (45%) | 5 |
| Sodium hydroxide (50%) | 5 |
| Sodium tripolyphosphate | 20 |
| Sodium xylene sulfonate (40%) | 0.5 |
| Sodium hypochlorite (12.5% Available Chlorine) | 8 |

Note 6:
OXY-RITE ®, Noveon, Inc. (Example suitable rheology stabilizers are described in U.S. Pat. No. 6,083,422 to Ambuter et al, incorporated herein by reference.)

TABLE 24

|  | Viscosity mPa · s at about 25° C. | | |
| --- | --- | --- | --- |
| Polymer No. | Immed. | 24 Hr. | 1 Week |
| AE, Ex. 1 | 350 | 1,020 | 36,000 |
| CP-3, Ex. 1 | 350 | 1,120 | 19,500 |

The stability of the viscosity was judged acceptable in the art.

If higher or lower viscosity is desired, the active weight % of the polymer can be increased or decreased accordingly.

If desired, an oxygen releasing disinfectant, such as a hydrogen peroxide compound, may be substituted in place of the chlorine bleach.

EXAMPLE 59

Highly Alkaline Washing Liquids

This example illustrates the use of Polymer AE and of Comparative HASE Polymer CP-3 in a highly alkaline (pH>12.5) formulation containing disinfectant, suitable for use as substantially clear, bleach-containing laundry prespotters, bleach-containing mold and mildew cleansers, and the like, employing the formulation shown in Table 25. The results are shown in Table 26.

TABLE 25

| Ingredient | Weight % |
| --- | --- |
| Polymer, as indicated in Table 26 | 1 |
| Deionized Water to 100% | q.s. |

TABLE 25-continued

| Ingredient | Weight % |
|---|---|
| Rheology stabilizer (Note 6, Table 23) | 0.1 |
| Sodium hydroxide (50%) | 2.5 |
| Sodium hypochlorite (12.5% Available Chlorine) | 8 |

TABLE 26

| | Viscosity mPa · s | | |
|---|---|---|---|
| Polymer No. | Immed. | at 25° C. 4 weeks | at 45° C. 4 weeks |
| AE, Ex. 1 | 2,900 | 6,300 | 5,200 |
| CP-3, Ex. 1 | 2,200 | 5,750 | 6,100 |

The products were prepared by combining the polymer, water and rheology stabilizer, adjusting the pH with the sodium hydroxide to greater than about pH 12.5, and then adding the chlorine bleach. Fragrance can be added, if desired. Alternatively, an oxygen releasing bleach, such as a hydrogen peroxide compound, may be substituted in place of the chlorine bleach.

EXAMPLE 60

Aqueous Silicone Gels

This example illustrates the use of ASAP of Example 1, Polymers Q (Ex. 60A), Y (Ex. 60B) and Z (Ex. 60C) each in aqueous silicone polymer-containing gels employing an active polymer weight of about 1.5% in the formulation shown in Table 27. The results are shown in Table 28.

TABLE 27

| Ingredient | Weight % |
|---|---|
| Polymer, as indicated in Table 28 | 1.5 |
| Deionized Water to 100% | q.s. |
| Solubilized fragrance | q.s. |
| Dimethicone PEG-7 phthalate (Note 1, Table 12) | 0.3 |
| UV Stabilizer | q.s. |
| Preservative | q.s. |
| AMP to pH as indicated in Table 28 | q.s. |

TABLE 28

| | Ex. 60A (Polymer Q) | Ex. 60B (Polymer Y) | Ex. 60C (Polymer Z) |
|---|---|---|---|
| pH | 6.9 | 7.1 | 7 |
| Immed. Visc., mPa · s | 59,800 | 77,800 | 58,000 |
| 24 Hr. Visc., mPa · s | 60,200 | 77,900 | 58,200 |
| % Clarity | 62.9 | 76.2 | 75.4 |

EXAMPLE 61

Aqueous Conditioning Gels

This example illustrates the use of ASAP of Example 1, Polymers Q (Ex. 61A), Y (Ex. 61B) and Z (Ex. 61C), each at an active polymer weight of about 1.2% in aqueous gels containing a cationic conditioning agent employing the formulation shown in Table 29. The results are in Table 30.

TABLE 29

| Ingredient | Weight % |
|---|---|
| Polymer, as indicated in Table 30 | 1.2 |
| Deionized Water to 100% | q.s. |
| Panthenol | 0.1 |
| Solubilized fragrance | q.s. |
| Polyquaternium-11 (Note 7) | 0.1 |
| Preservative | q.s |
| AMP to pH indicated in Table 30 | q.s. |

Note 7.
INCI name for quaternized vinyl pyrrolidone/dimethylaminoethyl methacrylate copolymer, neutralized (GAFQUAT ® 755N, ISP).

TABLE 30

| | Ex. 61A (Polymer Q) | Ex. 61B (Polymer Y) | Ex. 61C (Polymer Z) |
|---|---|---|---|
| pH | 7.1 | 7.1 | 7.1 |
| Immed. Visc., mPa · s | 41,200 | 37,800 | 48,200 |
| 24 Hr. Visc., mPa · s | 38,100 | 38,400 | 79,000 |
| % Clarity | 60.5 | 72 | 71.8 |

EXAMPLE 62

Clear Spray Gels

This example illustrates the use of ASAP of Example 1, Polymers A (Ex. 62A), C (Ex. 62B), and Y (Ex. 62C), each an active polymer weight of about 0.8% in aqueous clear spray gels employing the formulation shown in Table 31. The results are shown in Table 32.

TABLE 31

| Ingredient | Weight % |
|---|---|
| Polymer, as indicated in Table 32 | 0.8 |
| Deionized Water to 100% | q.s. |
| Glycerin | 2 |
| Preservative | q.s. |
| Triethanolamine to pH indicated in Table 32 | q.s. |
| Metal ion chelating agent | q.s. |

TABLE 32

| | Ex. 62A (Polymer A) | Ex. 62B (Polymer C) | Ex. 62C (Polymer Y) |
|---|---|---|---|
| pH | 6.8 | 7 | 6.5 |
| Immed. Visc., mPa · s | 7,520 | 7,800 | 2,940 |
| 24 Hr. Visc., mPa · s | 9,440 | 8,040 | 4,600 |
| % Clarity | 73 | 69 | 82 |

EXAMPLE 63

Textile Treatments

This example illustrates the use of Polymer AS as a thickener in a textile print paste (Ex. 63A) and in a textile coating formulation (Ex. 63B), at the active polymer weight % indicated in Table 33.

TABLE 33

| Ingredient | Weight % | |
| --- | --- | --- |
| | Ex. 63A | Ex. 63B |
| Water to 100% | q.s. | q.s. |
| Polymer AS, Ex. 1 | 1.5 | 0.76 |
| Ammonium hydroxide (28%) to pH | 9.7 | 8.5 |
| Acrylic emulsion binder | 5 | 41.86 |
| | (Note 8) | (Note 9) |
| Pigment | 5 | — |
| General defoamer (Note 10) | — | 0.25 |
| Ammonium nitrate (25%) | — | 0.45 |
| Viscosity, mPa·s (24 hours) | 28,000 | 244,500* |

*Brookfield Model RVF, Spindle #6 at 4 rpm.
Note 8.
PRINTRITE® 595, Noveon, Inc.
Note 9.
HYCAR® 2671, Noveon, Inc.
Note 10.
FOAMASTER® DF-160L, Henkel Corp.

EXAMPLE 64

Conditioning Shampoo

This example illustrates the use of Polymer U of Example 1 in a pearlescent conditioning shampoo at an active polymer weight of about 1.5% employing the formulation shown in Table 34.

TABLE 34

| Ingredients (INCI/Trade Name) | Wt. % |
| --- | --- |
| Part A | |
| 1. Deionized water | 40.3 |
| 2. Polymer U, Ex. 1 | 1.5 |
| 3. Sodium laureth sulfate (28%) (Note 4, Table 16) | 30 |
| 4. NaOH (18%) to pH 6.5 | q.s. |
| Part B | |
| 5. Cocoamidopropyl hydroxysultaine (50%) | 10 |
| 6. Disodium laureth sulfosuccinate (40%) | 10 |
| Part C | |
| 7. Deionized water | 3 |
| 8. Mica and titanium dioxide (Note 11) | 0.2 |
| Part D | |
| 9. Dimethicone (60,000 cst) (Note 12) | 3 |
| 10. Preservative | q.s. |
| Fragrance | q.s. |
| 11. Citric Acid (50%) to pH 5.3-5.7 | q.s. |
| | final weight 100 |

Note 11.
Mixture sold under the trade name TIMIRON® MP-115 Starluster by Rona/Merck KGaA.
Note 12.
A volatile dimethyl polysiloxane sold under the trade name Dow Corning 200 Fluid by Dow Corning Corporation.

Part A of the shampoo was prepared by admixing Polymer U and deionized water, then mixing in the surfactant (#3) with gentle mixing action and then adjusting the mixture to a pH of about 6.5 with the alkali (#4) to provide a gel phase. The ingredients of Part B were then admixed into the gel phase in the order listed. The ingredients of Part C were premixed and the premix was added to the foregoing batch mixture. Ingredients #9 and #10 of Part D were then added to the batch in the order listed and the pH of the final shampoo was adjusted with ingredient #11.

The final pH of the pearlescent shampoo product was about pH 5.5, the Brookfield viscosity was about 3,640 mPa·s initially and about 4,420 mPa·s after 24 hours. The pearlescent shampoo can also be prepared with mica or titanium dioxide as the opacifying, cosmetic pigment, ingredient #8.

EXAMPLES 65-69

Aqueous Gels

It is known that the viscosity achieved with commonly employed anionic polymeric thickeners can be negatively affected by the presence of some conventional anionic polymers. This example illustrates the compatibility of the ASAP of this invention with anionic polymeric thickeners, such as carbomer polymer, and hydrophobically-modified carbomer polymer, in aqueous gels.

A first series of aqueous gels (Exs. 65-69) were separately prepared, each gel containing one of the following ASAP of Example 1: Polymer H (Exs. 65 A-I), Polymer Y (Exs. 66 A-I), Polymer Z (Exs. 67 A-I), Polymer AT (Exs. 68 A-L), Polymer AU (Exs. 69 A-I) and either a carbomer polymer, or hydrophobically-modified carbomer, as identified, and in the amount indicated, in Tables 35-39, respectively. The commercial thickener products employed having the INCI name, Carbomer, were: a traditional carbomer polymer, CARBOPOL® 980 polymer, and a hydrophobically-modified carbomer polymer, CARBOPOL® Ultrez 21 polymer, both sold by Noveon, Inc. (Cleveland, Ohio). Other commercial hydrophobically-modified carbomer polymers employed were: CARBOPOL® ETD 2020 polymer, also sold by Noveon, Inc., having the INCI name, Acrylates/$C_{10-30}$ Alkyl Acrylate Crosspolymer, and STABYLEN® 30, sold by 3V Inc., having the INCI name, Acrylates/Vinyl Isodecanoate.

The aqueous gels were prepared by dispersing the selected commercial polymeric thickener in a portion of the total water content, neutralizing the dispersion with AMP (95%) to a pH in the range of about 6-6.5, then adding the required selected amount of aqueous emulsion of ASAP of Example 1, and adjusting the water content and pH, if needed, to maintain the foregoing pH or clarity. The pH, % clarity, and viscosity (24-hour) of the gels is shown in Tables 35-39.

TABLE 35

| Ex. No. | Polymer in Gel | Active Wt. % | pH | % Clarity | Viscosity mPa·s (24 hours) |
| --- | --- | --- | --- | --- | --- |
| 65A | Polymer H, Ex. 1 | 0.5 | 6.4 | 90.2 | 47,600 |
| | CARBOPOL® ETD 2020 | 0.5 | | | |
| 65B | Polymer H, Ex. 1 | 0.75 | 6.2 | 84.4 | 64,200 |
| | CARBOPOL® ETD 2020 | 0.5 | | | |
| 65C | Polymer H, Ex. 1 | 1 | 6.4 | 89.6 | 65,800 |
| | CARBOPOL® ETD 2020 | 0.25 | | | |
| 65D | Polymer H, Ex. 1 | 0.5 | 6.4 | 92.8 | 42,800 |
| | CARBOPOL® 980 | 0.5 | | | |
| 65E | Polymer H, Ex. 1 | 0.75 | 6.4 | 90.2 | 52,000 |
| | CARBOPOL® 980 | 0.5 | | | |
| 65F | Polymer H, Ex. 1 | 1 | 6.5 | 90.9 | 49,200 |
| | CARBOPOL® 980 | 0.25 | | | |
| 65G | Polymer H, Ex. 1 | 0.5 | 6.4 | 93.7 | 72,200 |
| | CARBOPOL® Ultrez 21 | 0.5 | | | |
| 65H | Polymer H, Ex. 1 | 0.75 | 6.4 | 92.8 | 88,200 |
| | CARBOPOL® Ultrez 21 | 0.5 | | | |

TABLE 35-continued

| Ex. No. | Polymer in Gel | Active Wt. % | pH | % Clarity | Viscosity mPa·s (24 hours) |
|---|---|---|---|---|---|
| 65I | Polymer H, Ex. 1 CARBOPOL ® Ultrez 21 | 1 0.25 | 6.4 | 93.2 | 76,600 |

TABLE 36

| Ex. No. | Polymer in Gel | Active Wt. % | pH | % Clarity | Viscosity mPa·s (24 hours) |
|---|---|---|---|---|---|
| 66A | Polymer Y, Ex. 1 CARBOPOL ® ETD 2020 | 0.5 0.5 | 6.4 | 82.6 | 44,600 |
| 66B | Polymer Y, Ex. 1 CARBOPOL ® ETD 2020 | 0.75 0.5 | 6.3 | 79.8 | 57,800 |
| 66C | Polymer Y, Ex. 1 CARBOPOL ® ETD 2020 | 1 0.25 | 6.4 | 78.3 | 55,800 |
| 66D | Polymer Y, Ex. 1 CARBOPOL ® 980 | 0.5 0.5 | 6.4 | 88.1 | 44,700 |
| 66E | Polymer Y, Ex. 1 CARBOPOL ® 980 | 0.75 0.5 | 6.4 | 84.5 | 55,200 |
| 66F | Polymer Y, Ex. 1 CARBOPOL ® 980 | 1 0.25 | 6.4 | 88 | 50,000 |
| 66G | Polymer Y, Ex. 1 CARBOPOL ® Ultrez 21 | 0.5 0.5 | 6.5 | 91.9 | 63,600 |
| 66H | Polymer Y, Ex. 1 CARBOPOL ® Ultrez 21 | 0.75 0.5 | 6.5 | 92 | 81,800 |
| 66I | Polymer Y, Ex. 1 CARBOPOL ® Ultrez 21 | 1 0.25 | 6.5 | 91.3 | 59,800 |

TABLE 37

| Ex. No. | Polymer in Gel | Active Wt. % | pH | % Clarity | Viscosity mPa·s (24 hours) |
|---|---|---|---|---|---|
| 67A | Polymer Z, Ex. 1 CARBOPOL ® ETD 2020 | 0.5 0.5 | 6.3 | 76.9 | 40,200 |
| 67B | Polymer Z, Ex. 1 CARBOPOL ® ETD 2020 | 0.75 0.5 | 6.5 | 81.2 | 57,200 |
| 67C | Polymer Z, Ex. 1 CARBOPOL ® ETD 2020 | 1 0.25 | 6.4 | 80.9 | 36,200 |
| 67D | Polymer Z, Ex. 1 CARBOPOL ® 980 | 0.5 0.5 | 6.5 | 88.9 | 34,400 |
| 67E | Polymer Z, Ex. 1 CARBOPOL ® 980 | 0.75 0.5 | 6.4 | 81.8 | 42,000 |
| 67F | Polymer Z, Ex. 1 CARBOPOL ® 980 | 1 0.25 | 6.4 | 82.7 | 40,200 |
| 67G | Polymer Z, Ex. 1 CARBOPOL ® Ultrez 21 | 0.5 0.5 | 6.5 | 90.5 | 51,200 |
| 67H | Polymer Z, Ex. 1 CARBOPOL ® Ultrez 21 | 0.75 0.5 | 6.5 | 90.1 | 59,800 |
| 67I | Polymer Z, Ex. 1 CARBOPOL ® Ultrez 21 | 1 0.25 | 6.5 | 89.3 | 45,900 |

TABLE 38

| Ex. No. | Polymer in Gel | Active Wt. % | pH | % Clarity | Viscosity mPa·s (24 hours) |
|---|---|---|---|---|---|
| 68A | Polymer AT, Ex. 1 CARBOPOL ® ETD 2020 | 0.5 0.5 | 6.5 | 87.5 | 56,400 |
| 68B | Polymer AT, Ex. 1 CARBOPOL ® ETD 2020 | 0.75 0.5 | 6.5 | 85.5 | 83,200 |
| 68C | Polymer AT, Ex. 1 CARBOPOL ® ETD 2020 | 1 0.25 | 6.5 | 80.9 | 45,600 |
| 68D | Polymer AT, Ex. 1 CARBOPOL ® 980 | 0.5 0.5 | 6.5 | 84.7 | 45,800 |
| 68E | Polymer AT, Ex. 1 CARBOPOL ® 980 | 0.75 0.5 | 6.5 | 82.7 | 62,800 |
| 68F | Polymer AT, Ex. 1 CARBOPOL ® 980 | 1 0.25 | 6.5 | 81.1 | 39,200 |
| 68G | Polymer AT, Ex. 1 CARBOPOL ® Ultrez 21 | 0.5 0.5 | 6.5 | 88.1 | 72,800 |
| 68H | Polymer AT, Ex. 1 CARBOPOL ® Ultrez 21 | 0.75 0.5 | 6.5 | 84.6 | 98,200 |
| 68I | Polymer AT, Ex. 1 CARBOPOL ® Ultrez 21 | 1 0.25 | 6.5 | 84.5 | 67,400 |
| 68J | Polymer AT, Ex. 1 STABYLEN ® 30 | 0.5 0.5 | 6.5 | 77.8 | 39,400 |
| 68K | Polymer AT, Ex. 1 STABYLEN ® 30 | 0.75 0.5 | 6.4 | 71.8 | 43,200 |
| 68L | Polymer AT, Ex. 1 STABYLEN ® 30 | 1 0.25 | 6.4 | 66.5 | 31,800 |

TABLE 39

| Ex. No. | Polymer in Gel | Active Wt. % | pH | % Clarity | Viscosity mPa·s (24 hours) |
|---|---|---|---|---|---|
| 69A | Polymer AU, Ex. 1 CARBOPOL ® ETD 2020 | 0.5 0.5 | 6.4 | 88.6 | 57,800 |
| 69B | Polymer AU, Ex. 1 CARBOPOL ® ETD 2020 | 0.75 0.5 | 6.5 | 89.5 | 73,400 |
| 69C | Polymer AU, Ex. 1 CARBOPOL ® ETD 2020 | 1 0.25 | 6.5 | 87.9 | 55,800 |
| 69D | Polymer AU, Ex. 1 CARBOPOL ® 980 | 0.5 0.5 | 6.5 | 89.9 | 43,400 |
| 69E | Polymer AU, Ex. 1 CARBOPOL ® 980 | 0.75 0.5 | 6.5 | 89.8 | 58,200 |
| 69F | Polymer AU, Ex. 1 CARBOPOL ® 980 | 1 0.25 | 6.5 | 89.3 | 47,600 |
| 69G | Polymer AU, Ex. 1 CARBOPOL ® Ultrez 21 | 0.5 0.5 | 6.5 | 89.2 | 70,000 |
| 69H | Polymer AU, Ex. 1 CARBOPOL ® Ultrez 21 | 0.75 0.5 | 6.5 | 85.8 | 79,800 |
| 69I | Polymer AU, Ex. 1 CARBOPOL ® Ultrez 21 | 1 0.25 | 6.5 | 88.5 | 51,600 |

A second series of aqueous gels containing each of the foregoing ASAP was prepared following the procedure described above except that, after the selected commercial thickener was dispersed in water, the selected ASAP was added and the resulting combination was then neutralized with AMP (95%) to about pH 6-6.5. The % clarity and 24-hour viscosity results achieved for this second series of aqueous gels were substantially similar to those of the corresponding ASAP-containing gels in the first series of aqueous gels.

The results show that the ASAP of this invention can be employed in combination with either conventional carbomer, or modified carbomer, thickeners in aqueous gel, without sacrificing viscosity.

For comparison, the viscosity achieved in an aqueous gel with the AMP-neutralized commercial polymer in the absence of ASAP is shown in Table 40.

TABLE 40

| Polymer in Gel | Active Wt. % | pH | Viscosity mPa·s (24 hours) |
|---|---|---|---|
| CARBOPOL ® ETD 2020 | 0.5 | 6.3 | 26,500-26,600 |
| CARBOPOL ® ETD 2020 | 0.25 | 6.3 | 16,650 |
| CARBOPOL ® 980 | 0.5 | 6.4 | 43,800 |

TABLE 40-continued

| Polymer in Gel | Active Wt. % | pH | Viscosity mPa · s (24 hours) |
|---|---|---|---|
| CARBOPOL ® 980 | 0.25 | 6.4 | 27,900 |
| CARBOPOL ® Ultrez 21 | 0.5 | 6.4 | 46,800-46,950 |
| CARBOPOL ® Ultrez 21 | 0.25 | 6.4 | 35,600 |
| STABYLEN ® 30 | 0.5 | 6.5 | 16,100 |
| STABYLEN ® 30 | 0.25 | 6.5 | 12,600 |

EXAMPLE 70

Aqueous Gels

This example demonstrates the use of ASAP, Polymer AT of Example 1, in combination with commercial hydrophobically-modified carbomer polymer, CARBOPOL® Ultrez 21 (Noveon, Inc., Cleveland Ohio) in beneficially achieving an unexpected increase in viscosity while maintaining the desirable aesthetic and gel pick-up product properties associated with gels produced with such commercially available polymer.

Aqueous gels were prepared containing the varying amounts of each polymer shown in Table 41 below. The gels were prepared by adding the commercial polymer to the water and pre-dispersing it by admixing with stirring for about 15 minutes, avoiding entraining air, and allowing the admixture to stand without stirring for about 30 minutes to provide a polymer dispersion. The requisite amount of Polymer AT emulsion was then admixed into the foregoing polymer dispersion and sufficient AMP (95%) was added to the polymeric mixture to adjust the pH to a range of about 6.4-6.8 to form a gel.

Two series of gels were prepared containing, on a composition weight basis, either a total polymer content of about 1.25 active weight % (Ex. 70A-F) or about 1 active weight % (Ex. 70G-K). The viscosity was determined by Method A. Gel pick-up was subjectively evaluated by dipping three fingers into the gel to scoop a dollop of gel and observing the cushioning properties of the gel adhering to the fingers. The term "cushioning" refers generally to the firmness of a gel and the ability of a dollop of gel to adhere to the fingers and hold a firm peak (i.e., a peaking gel). Gel pick-up was subjectively rated on the basis of observed cushioning as follows: excellent=pronounced and sustained peak, very good=medium and sustained peak, good=slight to medium peak, marginal=slight peak, and weak=no peak, smooth. Gel pick-up is a sensory product attribute that a consumer observes when the user physically removes gel from a container, such as a jar, or squeezes a gel out of a tube onto the fingers for application to the skin or hair. The results of the viscosity and gel pick-up evaluations are shown in Table 41.

TABLE 41

| Example No. | Weight % Polymer AT, (Ex. 1) | Weight % CARBOPOL ® Ultrez 21 | Brookfield Viscosity (mPa · s) | Gel Pick-Up |
|---|---|---|---|---|
| 70A | 1.25 | — | 21,200 | Weak |
| 70B | 1 | 0.25 | 60,400 | Good |
| 70C | 0.75 | 0.5 | 97,600 | Very Good |
| 70D | 0.5 | 0.75 | 125,000 | Excellent |
| 70E | 0.25 | 1 | 125,000 | Excellent |
| 70F | — | 1.25 | 93,600 | Excellent |
| 70G | 1 | — | 11,400 | Marginal |
| 70H | 0.75 | 0.25 | 21,800 | Good |
| 70I | 0.5 | 0.5 | 67,200 | Very Good |
| 70J | 0.25 | 0.75 | 93,800 | Excellent |
| 70K | — | 1 | 76,600 | Excellent |

The results show an unexpected increase in viscosity was achieved at a total polymer content of about 1.25 active weight % when the weight ratio of ASAP: commercial polymer was about 3:2 (Ex. 70C), about 2:3 (Ex. 70D) and about 1:4 (Ex. 70E). At a total polymer content of about 1 active weight %, an unexpected increase in viscosity was achieved when the weight ratio of ASAP: commercial polymer was about 1:3 (Ex. 70J).

The gel pick-up of Exs. 70B-E and Exs. 70H-J was judged good to excellent, indicating the compatibility of ASAP with the commercial polymer.

It was surprisingly found that alkali-swellable ASAP can be used in combination with anionic polymeric thickener, such as carbomer polymer or hydrophobically modified carbomer polymer, to provide a viscosity that is unexpectedly higher than the sum of the viscosity of the individual polymers at the same concentration.

From the foregoing examples, it can be seen that the present inventive polymers can be used in a wide variety of different aqueous and hydro-alcoholic compositions. The foregoing discussion and reported studies are intended to be illustrative of the present invention and are not to be taken as limiting. Still other variants within the spirit and scope of this invention are possible and will readily present themselves to those skilled in the art.

We claim:

1. An associative polymer that is the product of polymerization of a monomer mixture comprising:
   (a) at least one acidic vinyl monomer or a salt thereof;
   (b) at least one nonionic vinyl monomer;
   (c) a first associative monomer having a first hydrophobic end group;
   (d) at least one monomer selected from a second associative monomer having a second hydrophobic end group, a semihydrophobic monomer, and a combination thereof; and, optionally,
   (e) a monomer selected from a crosslinking monomer, a chain transfer agent, and a combination thereof; with the proviso that when monomer (d) is a second associative monomer and said semihydrophobic monomer is not present, the first and second hydrophobic end groups of associative monomers (c) and (d) are each selected from a substituted or unsubstituted $C_{22}$ and $C_{12}$ linear alkyl, respectively; wherein said first and second associative monomers are selected from at least one monomer of the formula:

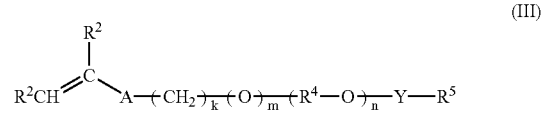

(III)

wherein, each $R^2$ is independently H, methyl, —C(O)OH, or —C(O)OR$^3$; $R^3$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; k is an integer in the range of 0 to about 30, and m is 0 or 1, with the proviso that when k is 0, m is 0, and when k is in the range of 1 to about 30, m is 1; $(R^4$—O)$_n$ is a polyoxyalkylene, which is a homopolymer, a random copolymer, or a block copolymer of $C_2$-$C_4$ oxyalkylene units, wherein $R^4$ is $C_2H_4$, $C_3H_6$, $C_4H_8$, and n is an integer in the range of about 5 to about 250, Y is —R$^4$O—, —R$^4$NH—, —C(O)—, —C(O)NH—, —R$^4$NHC(O)NH—, or —C(O)NHC(O)—; and $R^5$ is a substituted or unsubstituted alkyl selected from a $C_8$-$C_{40}$ linear alkyl, a $C_8$-$C_{40}$ branched alkyl, a $C_8$-$C_{40}$ carbocyclic alkyl, a $C_2$-$C_{40}$ alkyl-substituted phenyl, an aryl-substituted $C_2$-$C_{40}$ alkyl, and a $C_8$-$C_{80}$ complex ester; wherein the $R^5$ alkyl group optionally comprises one or more substituents selected from a hydroxyl group, an alkoxyl group, and a halogen group; and said semihydrophobic monomer is selected from at least one monomer of the formulas:

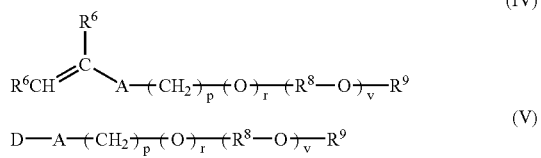

wherein, in each of formulas (IV) and (V), each $R^6$ is independently H, $C_1$-$C_{30}$ alkyl, —C(O)OH, or —C(O)OR$^7$; $R^7$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; p is an integer in the range of 0 to about 30, and r is 0 or 1, with the proviso that when p is 0, r is 0, and when p is in the range of 1 to about 30, r is 1; $(R^8$—O)$_v$ is a polyoxyalkylene, which is a homopolymer, a random copolymer or a block copolymer of $C_2$-$C_4$ oxyalkylene units, wherein $R^8$ is $C_2H_4$, $C_3H_6$, $C_4H_8$, and v is an integer in the range of about 5 to about 250, $R^9$ is H or $C_1$-$C_4$ alkyl; and D is a $C_8$-$C_{30}$ unsaturated alkyl or a carboxy-substituted $C_8$-$C_{30}$ unsaturated alkyl.

2. The polymer of claim 1 wherein the acidic vinyl monomer is selected from a carboxylic acid-containing vinyl monomer, a sulfonic acid-containing vinyl monomer, a phosphonic acid-containing vinyl monomer, and a combination thereof.

3. The polymer of claim 1 wherein the acidic vinyl monomer is acrylic acid, methacrylic acid, styrenesulfonic acid, 2-acrylamido-2-methylpropane sulfonic acid, or a combination thereof.

4. The polymer of claim 1 wherein the salt is selected from an alkali metal salt, an alkaline earth metal salt, an ammonium salt, an alkyl-substituted ammonium salt, and a combination thereof.

5. The polymer of claim 1 wherein the nonionic vinyl monomer is a compound selected from at least one of the following formulas $$CH_2\!=\!C(X)Z \qquad (I)$$

$$CH_2\!=\!CH\!-\!OC(O)R \qquad (II)$$

wherein, in each of formulas (I) and (II), X is H or methyl; Z is BC(O)OR$^1$, —C(O)NH$_2$, —C(O)NHR$^1$, —C(O)N(R$^1$)$_2$, —C$_6$H$_4$R$^1$, —C$_6$H$_4$OR$^1$, —C$_6$H$_4$Cl, —CN, —NHC(O)CH$_3$, —NHC(O)H$_2$N-(2-pyrrolidonyl), N-caprolactamyl, —C(O)NHC(CH$_3$)$_3$, —C(O)NHCH$_2$CH$_2$—N-ethyleneurea, —SiR$_3$, —C(O)O(CH$_2$)$_x$SiR$_3$, —C(O)NH(CH$_2$)$_x$SiR$_3$, or —(CH$_2$)$_x$SiR$_3$; x is an integer in the range of 1 to about 6; each R is independently $C_1$-$C_{18}$ alkyl; each $R^1$ is independently $C_1$-$C_{30}$ alkyl, hydroxy-substituted $C_1$-$C_{30}$ alkyl, or halogen-substituted $C_1$-$C_{30}$ alkyl.

6. The polymer of claim 1 wherein the nonionic vinyl monomer is selected from a $C_1$-$C_8$ ester of acrylic acid, a $C_1$-$C_8$ ester of methacrylic acid, and a combination thereof.

7. The polymer of claim 1 wherein the first and second associative monomers each comprise a polymerizable, unsaturated end group, a $C_8$-$C_{40}$ alkyl hydrophobic end group, and a polyoxyalkylene group disposed between and covalently bonded to the unsaturated end group and the hydrophobic end group.

8. The polymer of claim 7 wherein the polyoxyalkylene group is a homopolymer, a random copolymer, or a block copolymer comprising about 5 to about 250 $C_2$-$C_4$ oxyalkylene units.

9. The polymer of claim 1 wherein the monomer mixture includes at least one semihydrophobic monomer having a polymerizable, unsaturated end group and a polyoxyalkylene group covalently bonded thereto.

10. The polymer of claim 9 wherein the polyoxyalkylene group is a homopolymer, a random copolymer, or a block copolymer comprising about 5 to about 250 $C_2$-$C_4$ oxyalkylene units.

11. The polymer of claim 1 wherein the monomer mixture includes a semihydrophobic monomer having one of the following chemical formulas:

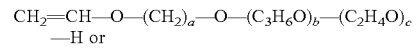

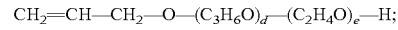

wherein a is 2, 3, or 4; b is an integer in the range of 1 to about 10; c is an integer in the range of about 5 to about 50; d is an integer in the range of 1 to about 10; and e is an integer in the range of about 5 to about 50.

12. The polymer of claim 1 wherein the monomer mixture contains at least one cross linking monomer.

13. The polymer of claim 12 wherein the crosslinking monomer is an acrylate ester of a polyol having at least two acrylate ester groups, a methacrylate ester of a polyol having at least two methacrylate ester groups or a combination thereof.

14. The polymer of claim 1 wherein the monomer mixture contains at least one chain transfer agent.

15. The polymer of claim 14 wherein the chain transfer agent is selected from a thio compound, a disulfide compound, a phosphite, a hypophosphite, a haloalkyl compound, and a combination thereof.

16. An associative polymer that is the product of polymerization of a monomer mixture comprising, on a total monomer mixture weight basis:
   (a) about 10 to about 75 weight percent of at least one acidic vinyl monomer or a salt thereof;
   (b) about 10 to about 90 weight percent of at least one nonionic vinyl monomer;
   (c) about 0.1 to about 25 weight percent of a first associative monomer having a first hydrophobic end group;

(d) about 0.1 to about 25 weight percent of at least one monomer selected from a second associative monomer having a second hydrophobic end group, a semihydrophobic monomer, and a combination thereof; and, optionally, (e) up to about 20 weight percent of a monomer selected from a crosslinking monomer, a chain transfer agent, and a combination thereof with the proviso that when monomer (d) is a second associative monomer and said semihydrophobic monomer is not present, the first and second hydrophobic end groups of associative monomers (c) and (d) are each selected from a substituted or unsubstituted $C_{22}$ and $C_{12}$ linear alkyl, respectively; wherein said first and second associative monomers are selected from at least one monomer of the formula:

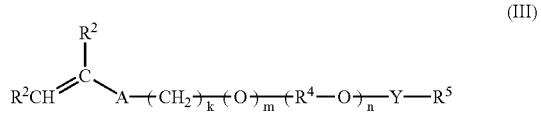

(III)

wherein, each $R^2$ is independently H, methyl, —C(O)OH, or —C(O)OR$^3$; $R^3$ is $C_1$-$C_{30}$ alkyl; A is —CH$_2$C(O)O—, —C(O)O—, —O—, —CH$_2$O—, —NHC(O)NH—, —C(O)NH—, —Ar—CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; k is an integer in the range of 0 to about 30, and m is 0 or 1, with the proviso that when k is 0, m is 0, and when k is in the range of 1 to about 30, m is 1; (R$^4$—O)$_n$ is a polyoxyalkylene, which is a homopolymer, a random copolymer, or a block copolymer of $C_2$-$C_4$ oxyalkylene units, wherein $R^4$ is $C_2H_4$, $C_3H_6$, $C_4H_8$, and n is an integer in the range of about 5 to about 250, Y is —R$^4$O—, —R$^4$NH—, —C(O)—, —C(O)NH—, —R$^4$NHC(O)NH—, or —C(O)NHC(O)—; and $R^5$ is a substituted or unsubstituted alkyl selected from a $C_8$-$C_{40}$ linear alkyl, a $C_8$-$C_{40}$ branched alkyl, a $C_8$-$C_{40}$ carbocyclic alkyl, a $C_2$-$C_{40}$ alkyl-substituted phenyl, an aryl-substituted $C_2$-$C_{40}$ alkyl, and a $C_8$-$C_{80}$ complex ester; wherein the $R^5$ alkyl group optionally comprises one or more substituents selected from a hydroxyl group, an alkoxyl group, and a halogen group; and said semihydrophobic monomer is selected from at least one monomer of the formulas:

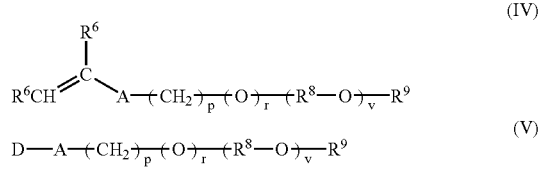

(IV)

(V)

wherein, in each of formulas (IV) and (V), each $R^6$ is independently H, $C_1$-$C_{30}$ alkyl, —C(O)OH, or —C(O)OR$^7$; $R^7$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; p is an integer in the range of 0 to about 30, and r is 0 or 1, with the proviso that when p is 0, r is 0, and when p is in the range of 1 to about 30, r is 1; (R$^8$—O)$_v$ is a polyoxyalkylene, which is a homopolymer, random copolymer or a block copolymer of $C_2$-$C_4$ oxyalkylene units, wherein $R^8$ is $C_2H_4$, $C_3H_6$, $C_4H_8$, and v is an integer in the range of about 5 to about 250, $R^9$ is H or $C_1$-$C_4$ alkyl; and D is a $C_8$-$C_{30}$ unsaturated alkyl or a carboxy-substituted $C_8$-$C_{30}$ unsaturated alkyl.

17. The polymer of claim 16 wherein the acidic vinyl monomer is selected from a carboxylic acid-containing vinyl monomer, a sulfonic acid-containing vinyl monomer, a phosphonic acid-containing vinyl monomer, and a combination thereof.

18. The polymer of claim 16 wherein the acidic vinyl monomer is acrylic acid, methacrylic acid, styrenesulfonic acid, 2-acrylamido-2-methylpropane sulfonic acid, or a combination thereof.

19. The polymer of claim 16 wherein the salt is selected from an alkali metal salt, an alkaline earth metal salt, an ammonium salt, an alkyl-substituted ammonium salt, and a combination thereof.

20. The polymer of claim 16 wherein the nonionic vinyl monomer is a compound selected from at least one of the following formulas

wherein, in each of formulas (I) and (II), X is H or methyl; Z is BC(O)OR$^1$, —C(O)NH$_2$, —C(O)NHR$^1$, —C(O)N(R$^1$)$_2$, —C$_6$H$_4$R$^1$, —C$_6$H$_4$OR$^1$, —C$_6$H$_4$Cl, —CN, —NHC(O)CH$_3$, —NHC(O)H, N-(2-pyrrolidonyl), N-caprolactamyl, —C(O)NHC(CH$_3$)$_3$, —C(O)NHCH$_2$CH$_2$—N-ethyleneurea, —SiR$_3$, —C(O)O(CH$_2$)$_x$SiR$_3$, —C(O)NH(CH$_2$)$_x$SiR$_3$, or —(CH$_2$)$_x$SiR$_3$; x is an integer in the range of 1 to about 6; each R is independently $C_1$-$C_{18}$ alkyl; each $R^1$ is independently $C_1$-$C_{30}$ alkyl, hydroxy-substituted $C_1$-$C_{30}$ alkyl, or halogen-substituted $C_1$-$C_{30}$ alkyl.

21. The polymer of claim 16 wherein the nonionic vinyl monomer is selected from a $C_1$-$C_8$ ester of acrylic acid, a $C_1$-$C_8$ ester of methacrylic acid, and a combination thereof.

22. The polymer of claim 16 wherein the first and second associative monomers each comprise a polymerizable, unsaturated end group, a $C_8$-$C_{40}$ alkyl hydrophobic end group, and a polyoxyalkylene group disposed between and covalently bonded to the unsaturated end group and the hydrophobic end group.

23. The polymer of claim 22 wherein the polyoxyalkylene group is a homopolymer, a random copolymer, or a block copolymer comprising about 5 to about 250 $C_2$-$C_4$ oxyalkylene units.

24. The polymer of claim 16 wherein the monomer mixture includes at least one semihydrophobic monomer having a polymerizable, unsaturated end group and a polyoxyalkylene group covalently bonded thereto.

25. The polymer of claim 24 wherein the polyoxyalkylene group is a homopolymer, a random copolymer, or a block copolymer comprising about 5 to about 250 $C_2$-$C_4$ oxyalkylene units.

26. The polymer of claim 16 wherein the monomer mixture includes a semihydrophobic monomer having one of the following chemical formulas:

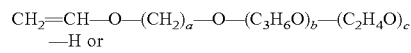

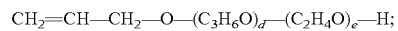

wherein a is 2, 3, or 4; b is an integer in the range of 1 to about 10; c is an integer in the range of about 5 to about 50; d is an integer in the range of 1 to about 10; and e is an integer in the range of about 5 to about 50.

27. The polymer of claim 16 wherein the monomer mixture includes about 0.1 to about 2 weight percent of a crosslinking monomer.

28. The polymer of claim 27 wherein the crosslinking monomer is an acrylate ester of a polyol having at least two acrylate ester groups, a methacrylate ester of a polyol having at least two methacrylate ester groups or a combination thereof.

29. The polymer of claim 16 wherein the monomer mixture includes about 0.1 to about 10 weight percent of at least one chain transfer agent.

30. The polymer of claim 29 wherein the chain transfer agent is selected from a thio compound, a disulfide compound, a phosphite, a hypophosphite, a haloalkyl compound, and a combination thereof.

31. An alkali-swellable associative polymer that is the product of polymerization of a monomer mixture comprising, on a total monomer mixture weight basis:
(a) about 30 to about 75 weight percent of at least one acidic vinyl monomer or a salt thereof;
(b) at least about 25 weight percent, but not more than 60 weight percent of at least one nonionic vinyl monomer;
(c) about 0.5 to about 20 weight percent of a first associative monomer having a first hydrophobic end group;
(d) about 0.5 to about 20 weight percent of at least one monomer selected from a second associative monomer having a second hydrophobic end group, a semihydrophobic monomer, and a combination thereof; and, optionally,
(e) up to about 20 weight percent of a crosslinking monomer; with the proviso that when monomer (d) is a second associative monomer and said semihydrophobic monomer is not present, the first and second hydrophobic end groups of associative monomers (c) and (d) are each selected from a substituted or unsubstituted $C_{22}$ and $C_{12}$ linear alkyl, respectively; wherein said first and second associative monomers are selected from at least one monomer of the formula:

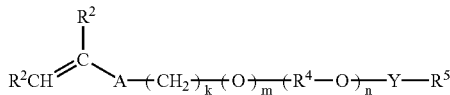

(III)

wherein, each $R^2$ is independently H, methyl, —C(O)OH, or —C(O)OR$^3$; $R^3$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; k is an integer in the range of 0 to about 30, and m is 0 or 1, with the proviso that when k is 0, m is 0, and when k is in the range of 1 to about 30, m is 1; (R$^4$—O)$_n$ is a polyoxyalkylene, which is a homopolymer, a random copolymer or a block copolymer of $C_2$-$C_4$ oxyalkylene units, wherein R$^4$ is $C_2H_4$, $C_3H_6$, $C_4H_8$, and n is an integer in the range of about 5 to about 250, Y is —R$^4$O—, —R$^4$NH—, —C(O)—, —C(O)NH—, —R$^4$NHC(O)NH—, or —C(O)NHC(O)—; and R$^5$ is a substituted or unsubstituted alkyl selected from a $C_8$-$C_{40}$ linear alkyl, a $C_8$-$C_{40}$ branched alkyl, a $C_8$-$C_{40}$ carbocyclic alkyl, a $C_2$-$C_{40}$ alkyl-substituted phenyl, an aryl-substituted $C_2$-$C_{40}$ alkyl, and a $C_8$-$C_{80}$ complex ester; wherein the R$^5$ alkyl group optionally comprises one or more substituents selected from a hydroxyl group, an alkoxyl group, and a halogen group; and said semihydrophobic monomer is selected from at least one monomer of the formulas;

$$R^6CH \overset{R^6}{\underset{}{=}} C \text{—} A\text{—}(CH_2)_p\text{—}(O)_r\text{—}(R^8\text{—}O)_v\text{—}R^9 \quad \text{(IV)}$$

$$D\text{—}A\text{—}(CH_2)_p\text{—}(O)_r\text{—}(R^8\text{—}O)_v\text{—}R^9 \quad \text{(V)}$$

wherein, in each of formulas (IV) and (V), each R$^6$ is independently H, $C_1$-$C_{30}$ alkyl, —C(O)OH, or —C(O)OR$^7$; R$^7$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; p is an integer in the range of 0 to about 30, and r is 0 or 1, with the proviso that when p is 0, r is 0, and when p is in the range of 1 to about 30, r is 1; (R$^8$—O)$_v$ is a polyoxyalkylene, which is a homopolymer, a random copolymer or a block copolymer of $C_2$-$C_4$ oxyalkylene units, wherein R$^8$ is $C_2H_4$, $C_3H_6$, $C_4H_8$, and v is an integer in the range of about 5 to about 250, R$^9$ is H or $C_1$-$C_4$ alkyl; and D is a $C_8$-$C_{30}$ unsaturated alkyl or a carboxy-substituted $C_8$-$C_{30}$ unsaturated alkyl.

32. The polymer of claim 31 wherein the acidic vinyl monomer is selected from a carboxylic acid-containing vinyl monomer, a sulfonic acid-containing vinyl monomer, a phosphonic acid-containing vinyl monomer, and a combination thereof.

33. The polymer of claim 31 wherein the acidic vinyl monomer is acrylic acid, methacrylic acid, styrenesulfonic acid, 2-acrylamido-2-methylpropane sulfonic acid, or a combination thereof.

34. The polymer of claim 31 wherein the salt is selected from an alkali metal salt, an alkaline earth metal salt, an ammonium salt, an alkyl-substituted ammonium salt, and a combination thereof.

35. The polymer of claim 31 wherein the nonionic vinyl monomer is selected from a $C_1$-$C_8$ ester of acrylic acid, a $C_1$-$C_8$ ester of methacrylic acid, and a combination thereof.

36. The polymer of claim 31 wherein the nonionic vinyl monomer is selected from ethyl acrylate, methyl methacrylate, and a combination thereof.

37. The polymer of claim 31 wherein the first and second associative monomers each comprise a polymerizable, unsaturated end group, a $C_8$-$C_{40}$ alkyl hydrophobic end group, and a polyoxyalkylene group disposed between and covalently bonded to the unsaturated end group and the hydrophobic end group.

38. The polymer of claim 37 wherein the polyoxyalkylene group is a homopolymer, a random copolymer, or a block copolymer comprising about 5 to about 250 $C_2$-$C_4$ oxyalkylene units.

39. The polymer of claim 31 wherein the monomer mixture includes at least one semihydrophobic monomer having a polymerizable, unsaturated end group and a polyoxyalkylene group covalently bonded thereto.

40. The polymer of claim 39 wherein the polyoxyalkylene group is a homopolymer, a random copolymer, or a block copolymer comprising about 5 to about 250 $C_2$-$C_4$ oxyalkylene units.

41. The polymer of claim 31 wherein the monomer mixture includes a semihydrophobic monomer having one of the following chemical formulas:

$CH_2=CH-O-(CH_2)_a-O-(C_3H_6O)_b-(C_2H_4O)_c$
—H or $CH_2=CH-CH_2-O-(C_3H_6O)_d-(C_2H_4O)_e$—H;

wherein a is 2, 3, or 4; b is an integer in the range of 1 to about 10; c is an integer in the range of about 5 to about 50; d is an integer in the range of 1 to about 10; and e is an integer in the range of about 5 to about 50.

42. The polymer of claim 31 wherein the monomer mixture includes about 0.1 to about 2% of a crosslinking monomer.

43. The polymer of claim 42 wherein the crosslinking monomer is an acrylate ester of a polyol having at least two acrylate ester groups, a methacrylate ester of a polyol having at least two methacrylate ester groups or a combination thereof.

44. A polymer of claim 31 wherein the monomer mixture includes about 0.1 to about 2% of a chain transfer agent.

45. A polymer of claim 44 wherein the chain transfer agent is selected from a thio compound, a disulfide compound, a phosphite, a hypophosphite, a haloalkyl compound, and a combination thereof.

46. An alkali-soluble associative polymer that is the product of polymerization of a monomer mixture comprising, on a total monomer mixture weight basis:
  (a) about 10 to about 30 weight percent of at least one acidic vinyl monomer or a salt thereof;
  (b) more than 60 weight percent of at least one nonionic vinyl monomer;
  (c) about 0.5 to about 5 weight percent of at least one associative monomer having a hydrophobic end group;
  (d) about 0.5 to about 5 weight percent of at least one semihydrophobic monomer having a polymerizable, unsaturated end group and a polyoxyalkylene group covalently bonded thereto; and
  (e) about 0.5 to about 5 weight percent of a chain transfer agent; wherein said at least one associative monomer is selected from a monomer of the formula:

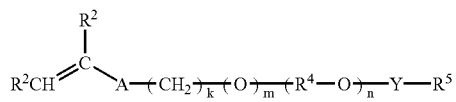

(III)

wherein, each $R^2$ is independently H, methyl, —C(O)OH, or —C(O)O$R^3$; $R^3$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; k is an integer in the range of 0 to about 30, and m is 0 or 1, with the proviso that when k is 0, m is 0, and when k is in the range of 1 to about 30, m is 1; (R$^4$—O)$_n$ is a polyoxyalkylene, which is a homopolymer, a random copolymer, or a block copolymer of C$_2$-C$_4$ oxyalkylene units, wherein R$^4$ is C$_2$H$_4$, C$_3$H$_6$, C$_4$H$_8$, and n is an integer in the range of about 5 to about 250, Y is —R$^4$O—, —R$^4$NH—, —C(O)—, —C(O)NH—, —R$^4$NHC(O)NH—, or —C(O)NHC(O)—; and R$^5$ is a substituted or unsubstituted alkyl selected from a C$_8$-C$_{40}$ linear alkyl, a C$_8$-C$_{40}$ branched alkyl, a C$_8$-C$_{40}$ carbocyclic alkyl, a C$_2$-C$_{40}$ alkyl-substituted phenyl, an aryl-substituted C$_2$-C$_{40}$ alkyl, and a C$_8$-C$_{80}$ complex ester; wherein the R$^5$ alkyl group optionally comprises one or more substituents selected from a hydroxyl group, an alkoxyl group, and a halogen group;

and said semihydrophobic monomer is selected from at least one monomer of the formulas;

(IV)

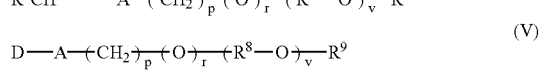

(V)

wherein, in each of formulas (IV) and (V), each $R^6$ is independently H, $C_1$-$C_{30}$ alkyl, —C(O)OH, or —C(O)O$R^7$; $R^7$ is $C_1$-$C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is H or methyl; z is 0 or 1; p is an integer in the range of 0 to about 30, and r is 0 or 1, with the proviso that when p is 0, r is 0, and when p is in the range of 1 to about 30, r is 1; (R$^8$—O)$_v$ is a polyoxyalkylene, which is a homopolymer, a random copolymer or a block copolymer of C$_2$-C$_4$ oxyalkylene units, wherein R$^8$ is C$_2$H$_4$, C$_3$H$_6$, C$_4$H$_8$, and v is an integer in the range of about 5 to about 250, R$^9$ is H or C$_1$-C$_4$ alkyl; and D is a C$_8$-C$_{30}$ unsaturated alkyl or a carboxy-substituted C$_8$-C$_{30}$ unsaturated alkyl.

47. The polymer of claim 46 wherein the acidic vinyl monomer is selected from a carboxylic acid-containing vinyl monomer, a sulfonic acid-containing vinyl monomer, a phosphonic acid-containing vinyl monomer, and a combination thereof.

48. The polymer of claim 46 wherein the acidic vinyl monomer is acrylic acid, methacrylic acid, styrenesulfonic acid, 2-acrylamido-2-methylpropane sulfonic acid, or a combination thereof.

49. The polymer of claim 46 wherein the salt is selected from an alkali metal salt, an alkaline earth metal salt, an ammonium salt, an alkyl-substituted ammonium salt, and a combination thereof.

50. The polymer of claim 46 wherein the nonionic vinyl monomer is selected from a $C_1$-$C_8$ ester of acrylic acid, a $C_1$-$C_8$ ester of methacrylic acid, and a combination thereof.

51. The polymer of claim 46 wherein the nonionic vinyl monomer is selected from ethyl acrylate, methyl methacrylate, and a combination thereof.

52. The polymer of claim 51 wherein the nonionic vinyl monomer comprises a combination of ethyl acrylate and methyl methacrylate in a weight ratio of at least about 2:1, respectively.

53. The polymer of claim 46 wherein the associative monomer comprises a polymerizable, unsaturated end group, a $C_8$-$C_{40}$ alkyl hydrophobic end group, and a polyoxyalkylene group disposed between and covalently bonded to the unsaturated end group and the hydrophobic end group.

54. The polymer of claim 53 wherein the polyoxyalkylene group of the associative monomer is a homopolymer, a random copolymer, or a block copolymer comprising about 5 to about 250 $C_2$-$C_4$ oxyalkylene units.

55. The polymer of claim 46 wherein the polyoxyalkylene group of the semihydrophobic monomer is a homopolymer, a random copolymer, or a block copolymer comprising about 5 to about 250 $C_2$-$C_4$ oxyalkylene units.

56. The polymer of claim 46 wherein the semihydrophobic monomer is a compound having one of the following chemical formulas:

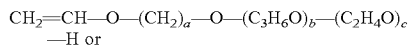

or

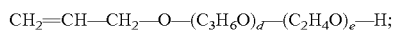

wherein a is 2, 3, or 4; b is an integer in the range of 1 to about 10; c is an integer in the range of about 5 to about 50; d is an integer in the range of 1 to about 10; and e is an integer in the range of about 5 to about 50.

57. The polymer of claim 46 wherein the chain transfer agent is selected from a thio compound, a disulfide compound, a phosphite, a hypophosphite, a haloalkyl compound, and a combination thereof.

* * * * *

UNITED STATES PATENT AND TRADEMARK OFFICE
CERTIFICATE OF CORRECTION

PATENT NO. : 7,288,616 B2 Page 1 of 1
APPLICATION NO. : 10/338275
DATED : October 30, 2007
INVENTOR(S) : Krishnan Tamareselvy et al.

It is certified that error appears in the above-identified patent and that said Letters Patent is hereby corrected as shown below:

Column 54, line 4, the term "-NHC(O)H$_2$N-(2-pyrrolidonyl)," should be changed to -- -NHC(O)H,N-(2-pyrrolidonyl), --

Column 55, line 31, the term "30, in" should be changed to -- 30, m --

Column 55, line 32, the term "(R$^4$-O)$_n$, is" should be changed to -- (R$^4$-O)$_n$ is --

Signed and Sealed this

Eighteenth Day of December, 2007

JON W. DUDAS
*Director of the United States Patent and Trademark Office*